(12) United States Patent
Mantel et al.

(10) Patent No.: US 9,886,503 B2
(45) Date of Patent: Feb. 6, 2018

(54) METHOD AND APPARATUS FOR MULTIPLEXING AUDIO PROGRAM CHANNELS FROM ONE OR MORE RECEIVED BROADCAST STREAMS TO PROVIDE A PLAYLIST STYLE LISTENING EXPERIENCE TO USERS

(75) Inventors: G. David Mantel, Boynton Beach, FL (US); Paul D. Marko, Pembroke Pines, FL (US)

(73) Assignee: Sirius XM Radio Inc., New York, NY (US)

( * ) Notice: Subject to any disclaimer, the term of this patent is extended or adjusted under 35 U.S.C. 154(b) by 449 days.

(21) Appl. No.: 12/735,211

(22) PCT Filed: Dec. 23, 2008

(86) PCT No.: PCT/US2008/014013
§ 371 (c)(1),
(2), (4) Date: Jun. 22, 2010

(87) PCT Pub. No.: WO2009/070343
PCT Pub. Date: Jun. 4, 2009

(65) Prior Publication Data
US 2010/0268361 A1  Oct. 21, 2010

Related U.S. Application Data

(60) Provisional application No. 61/009,204, filed on Dec. 27, 2007.

(51) Int. Cl.
*G06F 17/00* (2006.01)
*G06F 17/30* (2006.01)
(Continued)

(52) U.S. Cl.
CPC .. *G06F 17/30761* (2013.01); *G06F 17/30749* (2013.01); *G06F 17/30758* (2013.01);
(Continued)

(58) Field of Classification Search
CPC ......... G06F 17/30761; G06F 17/30749; G06F 17/30772
(Continued)

(56) References Cited

U.S. PATENT DOCUMENTS 5,973,723 A   10/1999  DeLuca et al.
6,414,720 B1  7/2002   Tsukidate et al.
(Continued)

FOREIGN PATENT DOCUMENTS

WO   WO2009154760 A1   12/2009
WO   WO2013192389 A1   12/2013

*Primary Examiner* — Andrew C Flanders
(74) *Attorney, Agent, or Firm* — Kramer Levin Naftalis & Frankel LLP

(57) ABSTRACT

A method and apparatus for generating a personalized radio channel playlist by time division multiplexing songs from multiple received channels from one or more broadcast source streams in a queue. Users can specify favorite channels for building their personal playlists, or multiple default playlist channels can be provided by genre. If matches are found, the channel carrying the favorite is extracted and added to the playlist. Channel searching for matches involves monitoring real-time song and artist labels for all channels carried in a separate data channel. Preview times can vary depending on the size of the playlist or number of channels used. During a preview of a segment, users can, opt to listen to the full song or back up in the playlist to listen to a previous song. Connectivity options and web interfaces are provided to facilitate transfer and sharing of customization parameters for personalized radio configuration.

34 Claims, 14 Drawing Sheets

(51) Int. Cl.
*G11B 27/10* (2006.01)
*H04H 20/10* (2008.01)
*H04H 20/30* (2008.01)
*H04H 60/46* (2008.01)
*H04H 60/47* (2008.01)
*H04H 60/73* (2008.01)
*H04H 60/74* (2008.01)

(52) U.S. Cl.
CPC ...... *G06F 17/30772* (2013.01); *G11B 27/105* (2013.01); *H04H 20/106* (2013.01); *H04H 20/30* (2013.01); *H04H 60/46* (2013.01); *H04H 60/47* (2013.01); *H04H 60/73* (2013.01); *H04H 60/74* (2013.01)

(58) Field of Classification Search
USPC ............. 700/94; 704/500–504; 381/119; 369/1–12
See application file for complete search history.

(56) References Cited

U.S. PATENT DOCUMENTS

| | | | |
|---|---|---|---|
| 6,564,003 B2 | 5/2003 | Marko et al. |
| 6,588,015 B1 | 7/2003 | Eyer et al. |
| 6,609,096 B1 | 8/2003 | De Bonet et al. |
| 6,694,316 B1 | 2/2004 | Langseth et al. |
| 6,785,656 B2 | 8/2004 | Patsiokas |
| 6,876,835 B1 | 4/2005 | Marko et al. |
| 6,961,511 B2 | 11/2005 | Ohno |
| 7,028,082 B1 | 4/2006 | Rosenberg et al. |
| 7,047,548 B2 | 5/2006 | Bates et al. |
| 7,054,546 B2 | 5/2006 | Murakami et al. |
| 7,058,376 B2 | 6/2006 | Logan et al. |
| 7,058,694 B1 | 6/2006 | De Bonet et al. |
| 7,116,894 B1 | 10/2006 | Chatterton |
| 7,343,179 B1 | 3/2008 | Theis et al. |
| 7,574,513 B2 | 8/2009 | Dunning et al. |
| 7,720,432 B1 | 5/2010 | Colby et al. |
| 7,725,919 B1 | 5/2010 | Thiagarajan et al. |
| 7,732,697 B1 | 6/2010 | Wieder |
| 7,831,663 B2 | 11/2010 | Ludwig et al. |
| 7,848,618 B2 | 12/2010 | Potrebic et al. |
| 7,941,525 B1 | 5/2011 | Yavilevich |
| 8,223,975 B2 | 7/2012 | Marko |
| 8,848,112 B2 | 9/2014 | Seo |
| 8,886,753 B2 | 11/2014 | Marcus |
| 8,917,974 B2 | 12/2014 | Oh |
| 8,971,541 B2 | 3/2015 | Marko |
| 9,075,807 B2 | 7/2015 | St. John-Larkin |
| 9,154,248 B2 | 10/2015 | Cox |
| 9,219,634 B1 | 12/2015 | Morse |
| 2001/0028782 A1 | 10/2001 | Ohno |
| 2002/0032019 A1 | 3/2002 | Marks et al. |
| 2003/0009765 A1 | 1/2003 | Linden et al. |
| 2003/0014767 A1 | 1/2003 | Stumphauzer, II |
| 2003/0037117 A1 | 2/2003 | Tabuchi |
| 2003/0115604 A1 | 6/2003 | Yamamura et al. |
| 2003/0128774 A1 | 7/2003 | Suzuki et al. |
| 2003/0135513 A1 | 7/2003 | Quinn et al. |
| 2003/0163823 A1 | 8/2003 | Logan et al. |
| 2003/0219222 A1 | 11/2003 | Fraleu et al. |
| 2003/0236843 A1 | 12/2003 | Weber et al. |
| 2004/0058641 A1 | 3/2004 | Acker |
| 2004/0153178 A1 | 8/2004 | Koch et al. |
| 2004/0255336 A1 | 12/2004 | Logan |
| 2004/0264442 A1 | 12/2004 | Kubler et al. |
| 2004/0266336 A1 | 12/2004 | Patsiokas et al. |
| 2005/0132418 A1 | 6/2005 | Barton et al. |
| 2005/0159122 A1 | 7/2005 | Mayer |
| 2005/0249080 A1 | 11/2005 | Foote et al. |
| 2005/0273833 A1 | 12/2005 | Soinio |
| 2005/0289151 A1 | 12/2005 | Burke |
| 2006/0029372 A1 | 2/2006 | Barrett et al. |
| 2006/0040609 A1 | 2/2006 | Petschke et al. |
| 2006/0083482 A1 | 4/2006 | Arora |
| 2006/0088000 A1 | 4/2006 | Hannu |
| 2006/0104314 A1 | 5/2006 | Miyaji et al. |
| 2006/0123053 A1 | 6/2006 | Scannell |
| 2006/0153408 A1 | 7/2006 | Faller et al. |
| 2006/0173974 A1 | 8/2006 | Tang |
| 2006/0212900 A1 | 9/2006 | Ismail et al. |
| 2006/0233378 A1 | 10/2006 | Kim et al. |
| 2006/0252457 A1 | 11/2006 | Schrager |
| 2007/0014312 A1 | 1/2007 | Sugimoto |
| 2007/0014536 A1 | 1/2007 | Hellman |
| 2007/0022197 A1 | 1/2007 | Logvinov et al. |
| 2007/0022454 A1 | 1/2007 | Yoon |
| 2007/0061759 A1 | 3/2007 | Klein, Jr. |
| 2007/0083901 A1 | 4/2007 | Bond |
| 2007/0087686 A1 | 4/2007 | Holm et al. |
| 2007/0093263 A1 | 4/2007 | Song |
| 2007/0097272 A1 | 5/2007 | Moradi |
| 2007/0123185 A1 | 5/2007 | Welk et al. |
| 2007/0124794 A1 | 5/2007 | Marko et al. |
| 2007/0192795 A1 | 8/2007 | Kellner et al. |
| 2007/0212023 A1 | 9/2007 | Whillock |
| 2007/0250319 A1 | 10/2007 | Tateishi et al. |
| 2007/0256100 A1 | 11/2007 | Jeong |
| 2007/0277214 A1 | 11/2007 | Kim et al. |
| 2008/0010648 A1 | 1/2008 | Ando et al. |
| 2008/0015718 A1 | 1/2008 | Yoneda et al. |
| 2008/0019371 A1 | 1/2008 | Anschutz et al. |
| 2008/0043685 A1 | 2/2008 | Sandblom |
| 2008/0069519 A1 | 3/2008 | Lang et al. |
| 2008/0092168 A1 | 4/2008 | Logan et al. |
| 2008/0101765 A1 | 5/2008 | Lee |
| 2008/0163290 A1 | 7/2008 | Marko |
| 2008/0168501 A1 | 7/2008 | Migos et al. |
| 2008/0199149 A1 | 8/2008 | Oh |
| 2008/0254751 A1 | 10/2008 | Lazaridis |
| 2008/0282036 A1 | 11/2008 | Ganesan |
| 2009/0019513 A1 | 1/2009 | Seong |
| 2009/0079872 A1 | 3/2009 | Seong |
| 2009/0165062 A1 | 6/2009 | Harris |
| 2009/0170457 A1 | 7/2009 | Videtich |
| 2009/0320075 A1 | 12/2009 | Marko |
| 2010/0268361 A1 | 10/2010 | Mantel |
| 2011/0004826 A1 | 1/2011 | Cho |
| 2011/0075985 A1 | 3/2011 | Potrebic |
| 2011/0129201 A1 | 6/2011 | McLean |
| 2012/0066404 A1 | 3/2012 | Evans et al. |
| 2012/0180083 A1 | 7/2012 | Marcus |
| 2012/0184202 A1 | 7/2012 | Gadoury |
| 2012/0144430 A1 | 8/2012 | Steele |

FIG. 3

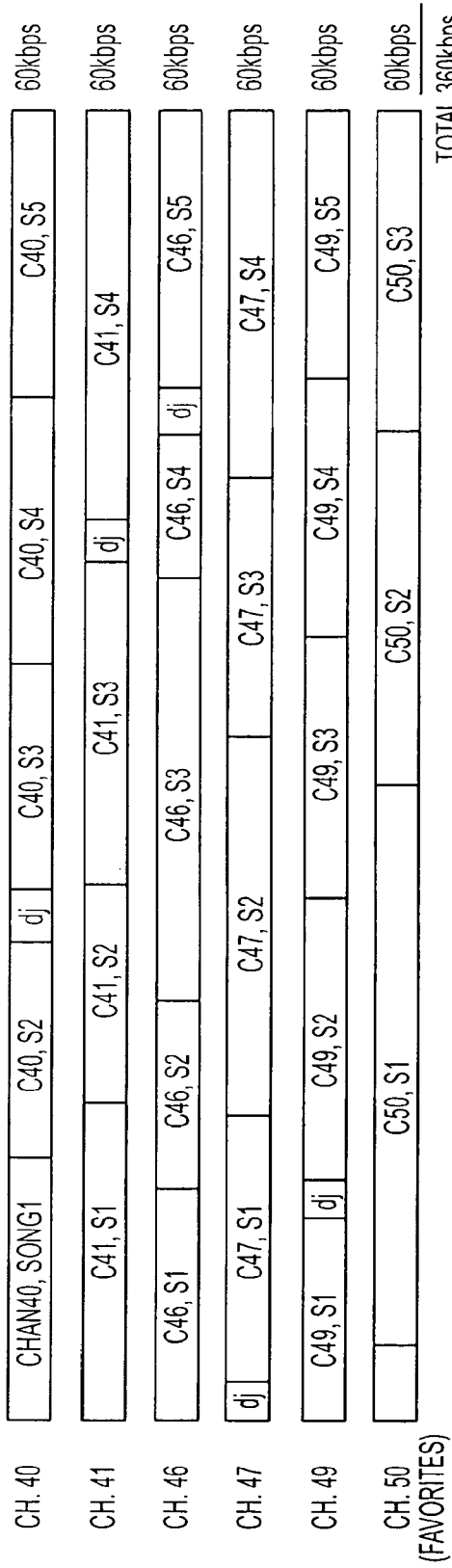
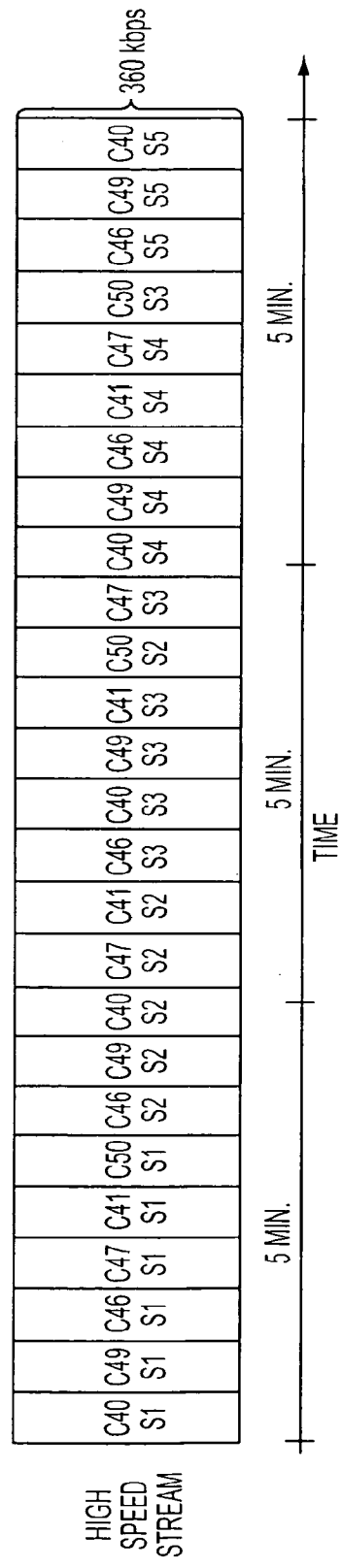

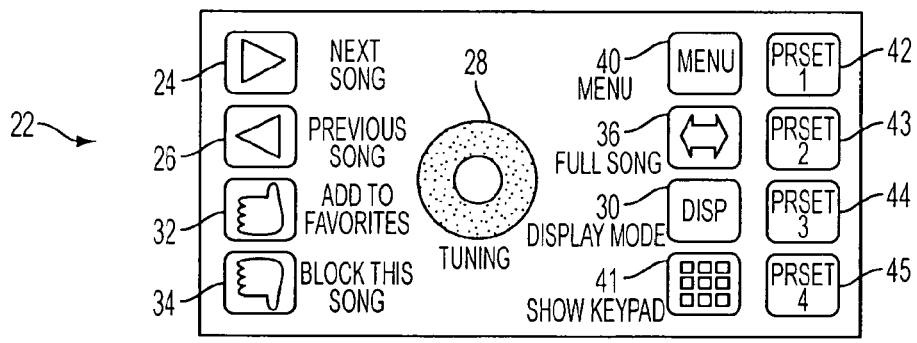

FIG. 6

DISPLAY MODE A
(SINGLE SONG)

FASTRACK 3 - ALTERNATIVE

ARTIST: HOOTERS

SONG: DAY BY DAY

FROM: CH. 46 - TOP TRACKS

SONGS IN QUEUE: 10      T - 35 SECONDS

COUNTDOWN TIMER — 38

FIG. 7

DISPLAY MODE B
(SONG LIST)

| FASTRACK 3 - ALTERNATIVE | |
|---|---|
| PREVIOUS: BLUR/GOOD SONG | CH43 |
| PLAYING: HOOTERS/DAY BY DAY | CH46 |
| NEXT  1: SUPER SESSION/STOP | CH40 |
|          2: FIXX/RED SKIES | CH44 |
|          3: DAVID BOWIE/MODERN LOVE | CH49 |
|          4: METALLICA/FADE TO BLACK | CH41 |
| SONGS IN QUEUE: 10 | TIME LEFT: 35 |

FIG. 8

METHOD AND APPARATUS FOR MULTIPLEXING AUDIO PROGRAM CHANNELS FROM ONE OR MORE RECEIVED BROADCAST STREAMS TO PROVIDE A PLAYLIST STYLE LISTENING EXPERIENCE TO USERS

FIELD OF THE INVENTION

The present invention relates to a system and method for providing a broadcast radio service listener with the ability to generate a personalized radio channel playlist on a radio receiver from broadcast content as it is received. More specifically, the present invention relates to a system and method for buffering content selected from among the broadcast channels of a source stream(s) as they are received, and for generating a playback stream using the buffered content that provides a multi-channel listening experience to the user with preview, reverse, fast forward and other navigation functions for the buffered content.

BACKGROUND OF THE INVENTION

On-line personalized radio service has demonstrated its appeal to music fans as evidenced by the continued growth of personalized radio service providers such as Pandora, LastFM and Slacker. These providers assemble personalized playlists for users by accessing a large music library where each song has a metadata field containing ratings on multiple stylistic parameters. A user inputs a preferred music style, and the provider's system extracts songs from the library for the playlist based on correlation to the song metadata field. Advantageously, users are provided with the capability to accelerate their discovery of new content which is largely aligned with their personal preferences, by skipping over content in the playlist which the user finds uninteresting.

A need exists for a personalized radio service using one or more broadcast services that provides personalized and updated content similar to conventional personalized radio services employing large music libraries, and that provides a spontaneous listening experience with greater opportunity for exposure to new music. A need exists for a live satellite radio offering with low cost hardware that does not require a large local song database to be built over time at a satellite receiver by recording content matches received over-the-air or via other broadcast method.

Conventional personalized radio services such as Pandora and Slacker enable users to set up different playlists for different genre preferences such as alternative, classical and comedy, but do not provide the capability to mix diverse personal content preferences into a single playlist. A need exists to expose users to diverse preferred content in a single continuous playlist without requiring manual interaction or forethought to change playlists or channels.

Satellite radio offers more than 100 channels of audio content. After initially exploring the content offering, subscribers typically narrow their listening choices to 10 or fewer favorite channels, which may be any combination of music and talk channels. For example, a subscriber may prefer listening to popular music and may preset 5 or 6 popular music channels on the radio, along with a comedy channel and news channel. With present radio receiver hardware, the subscriber is limited to listening to one channel at a time and therefore misses the opportunity to be exposed to content simultaneously broadcast on the other favorite channels. A need therefore exists for a satellite digital audio radio service (SDARS)-based personal radio service that provides the subscriber with an option to be exposed to content simultaneously broadcast on multiple channels selected for building a personalized radio channel playlist.

Conventional personalized radio services are disadvantageous in that user interaction with a computer is required to build the personalized playlist. A need exists for a personalized radio services that allows users who enjoy listening to music while driving to build a personalized radio channel playlist using a vehicle-installed radio receiver, thereby personalizing their received programming choices.

SUMMARY OF THE INVENTION

Exemplary embodiments of the present invention address at least the above problems and/or disadvantages and provide at least the advantages described below.

In accordance with an exemplary embodiment of the present invention, a method and apparatus (e.g., a receiver) and computer readable code on a computer-readable medium are provided for generating a playlist from one or more received broadcast streams.

In accordance with an exemplary embodiment of the present invention, a source stream comprising audio segments such as songs is transmitted to receivers. Metadata corresponding to each of the audio segments in the source stream is also transmitted to receivers. Filter data is generated at a receiver based on user inputs during playback of the received source stream that indicate preferred ones of the received audio segments. The filter data comprises metadata of the preferred received audio segments that is then used to extract other received audio segments having metadata that correlates with the filter data for generating the playlist.

In accordance with another exemplary embodiment of the present invention, the intelligence to determine what music segments are to be in predetermined playback channel playlist(s) is provided at an uplink device, as opposed to a receiver determining if sufficient correlation exists between transmitted data channel metadata and filter data generated at the receiver based on user inputs.

In accordance with exemplary embodiments of the present invention, at least one of a title, artist and channel identifier for each of the audio segments in the playlist is displayed. A user can be provided with navigation control inputs to scroll forward and backward in the playlist to see the currently stored audio segments, and to select and playback the audio segments in the playlist. A user can also be provided with a user control input to select and store one of the audio segments in the playlist to a favorite song file in a non-volatile memory. In any event, a user can merely tune to the personalized radio channel playlist or Auto Track and listen to the corresponding buffered content, which has been extracted from plural channels in many instances, without requiring any navigation or channel selection if desired.

In accordance with another exemplary embodiment of the present invention, playlist configuration data can be stored comprising at least one of the filter data, and a playlist of audio segments generated using the filter data. The playlist configuration data can be transferred between at least two playback devices.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which:

FIG. 3 depicts five exemplary simultaneously broadcast channels (e.g., Ch. 40, Ch. 41, Ch. 46, Ch. 47 and Ch. 49) selected to build a personalized radio playlist and monitored and extracted favorite segments from non-selected channels from one or more source streams for building the personalized radio channel playlist in accordance with an exemplary embodiment of the present invention;

FIG. 4A depicts six selected channels for building a personalized radio channel playlist along with the respective stream bit rate for each channel, which are essentially the same group of channels described with reference to FIG. 3 with the exception of a Ch. 50 being extracted in lieu of implementing a favorites channel (CH. X) in accordance with an exemplary embodiment of the present invention;

FIG. 4B depicts a high speed stream (e.g., 360 kbps) constituted by songs from multiple channels that are transmitted faster than real-time (e.g., 6 times faster than 60 kbps) in accordance with an exemplary embodiment of the present invention;

FIG. 6 is an exemplary control interface on a radio receiver that provides navigation tools to see playlist song titles on a display and reverse and fast forward through the playlist, preview functions to optionally play shortened segments of each song/segment or the full-length song/segment, and user control inputs to specify favorite or banned items to be included or excluded from playlists in accordance with an exemplary embodiment of the present invention;

FIGS. 7 and 8 are exemplary displays on a radio receiver for viewing playlist information in accordance with an exemplary embodiment of the present invention;

Throughout the drawings, the same drawing reference numerals will be understood to refer to the same elements, features, and structures.

DETAILED DESCRIPTION OF THE EXEMPLARY EMBODIMENTS

Figure 1:
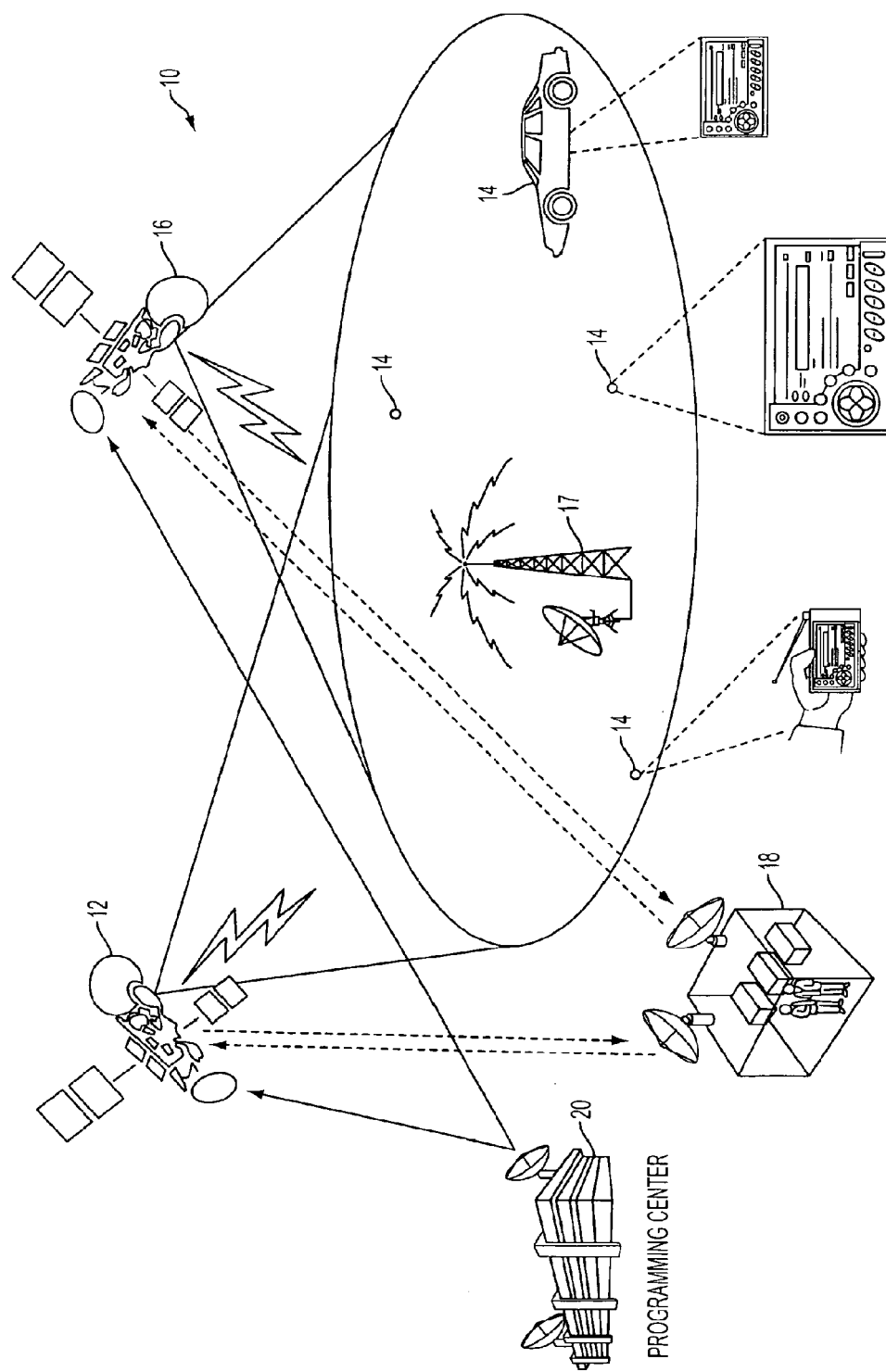
FIG. 1 depicts a multiplexed uplink broadcast transmission system for providing radio receivers with broadcast program channels from which to build personalized radio channel playlists in accordance with an exemplary embodiment of the present invention.

Several exemplary embodiments of the present invention are described herein. Briefly, the present invention provides a radio receiver configured to receive at least one broadcast stream comprising a plurality of different content channels. The radio receiver selects multiple channels from among the plurality of broadcast channels and buffers content from the selected channels as they are received simultaneously via the received broadcast stream(s). The buffered content is used to generate a personalized radio channel playlist that gives a listener a personalized, multiple-channel listening experience.

In accordance with one embodiment of the present invention, the multiple selected channels are pre-selected and stored at the receiver (e.g., plural channels that provide a selected genre of music) to automatically generate a personalized playback channel playlist for the user without the user having to enter specific channels via a user interface on the receiver. In accordance with another embodiment of the present invention, the multiple selected channels are specified by the user (e.g., a combination of favorite music channels and a news channel or comedy channel) via the receiver or another device that interfaces with the receiver. The channels in the broadcast streams can be transmitted at a real-time rate, or can be provided as fast channels that are broadcast at a rate that is n times faster than the real-time rate, which builds a buffer of personalized content at a rate faster than real-time rate.

In accordance with another embodiment of the present invention, audio segments such as music segments on various ones of the plurality of broadcast channels can be selected (i.e., as opposed to predetermined channel selection) and stored at the receiver to automatically generate a personalized playback channel playlist. For example, and as described below in connection with FIG. 19, the source stream can comprise a data channel that broadcasts metadata for each music segment being transmitted on the plurality of broadcast channels in advance of the segments' transmission. A receiver can receive user inputs from which to create filter data that is used to correlate with the received metadata on the data channel. Music segments for which a correlation exceeds a selected threshold are buffered for the personalized playback channel playlist. In accordance with another exemplary embodiment, the intelligence to determine what music segments are to be in the personalized playback channel playlist(s) is provided at an uplink device, as opposed to a receiver determining if sufficient correlation exists between transmitted data channel metadata and filter data generated at the receiver based on user inputs.

In any event, a user can merely tune to the personalized radio channel playlist or Auto Track and listen to the corresponding buffered content, which has been extracted from plural channels in many instances, without requiring any navigation or channel selection if desired. Additional embodiments of the present invention pertaining to buffer management, playlist navigation and management, customization and connectivity features, and content insertion are described below.

The exemplary embodiments are described herein with respect to a satellite digital audio radio service (SDARS) that is transmitted to the receivers by one or more satellites and/or terrestrial repeaters. It is to be understood that the source content stream(s) used to create a personalized radio channel playlist in accordance with the present invention can be broadcast using other content systems (e.g., other digital audio broadcast (DAB) systems or high definition (HD) radio systems), as well as other wireless or wired methods for signal transmission.

FIG. 1 depicts an illustrative system for transmitting at least one exemplary source stream to radio receivers 14. In the illustrative embodiment, the source stream provides SDARS.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and that satellites in other types of orbits can be used.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of payload channels and auxiliary information.

With reference to FIG. 1, the programming center 20 is configured to obtain content from different information sources and providers and to provide the content to corresponding encoders. The content can comprise both analog and digital information such as audio, video, data, program label information, auxiliary information, and so on. For example, the programming center 20 can provide SDARS having on the order of 100 different audio program channels to transmit different types of music programs (e.g., jazz, classical, rock, religious, country, and so on) and news programs (e.g., regional, national, political, financial, sports). The SDARS can also provide emergency information, travel advisory information, educational programs, and the like.

Figure 2:
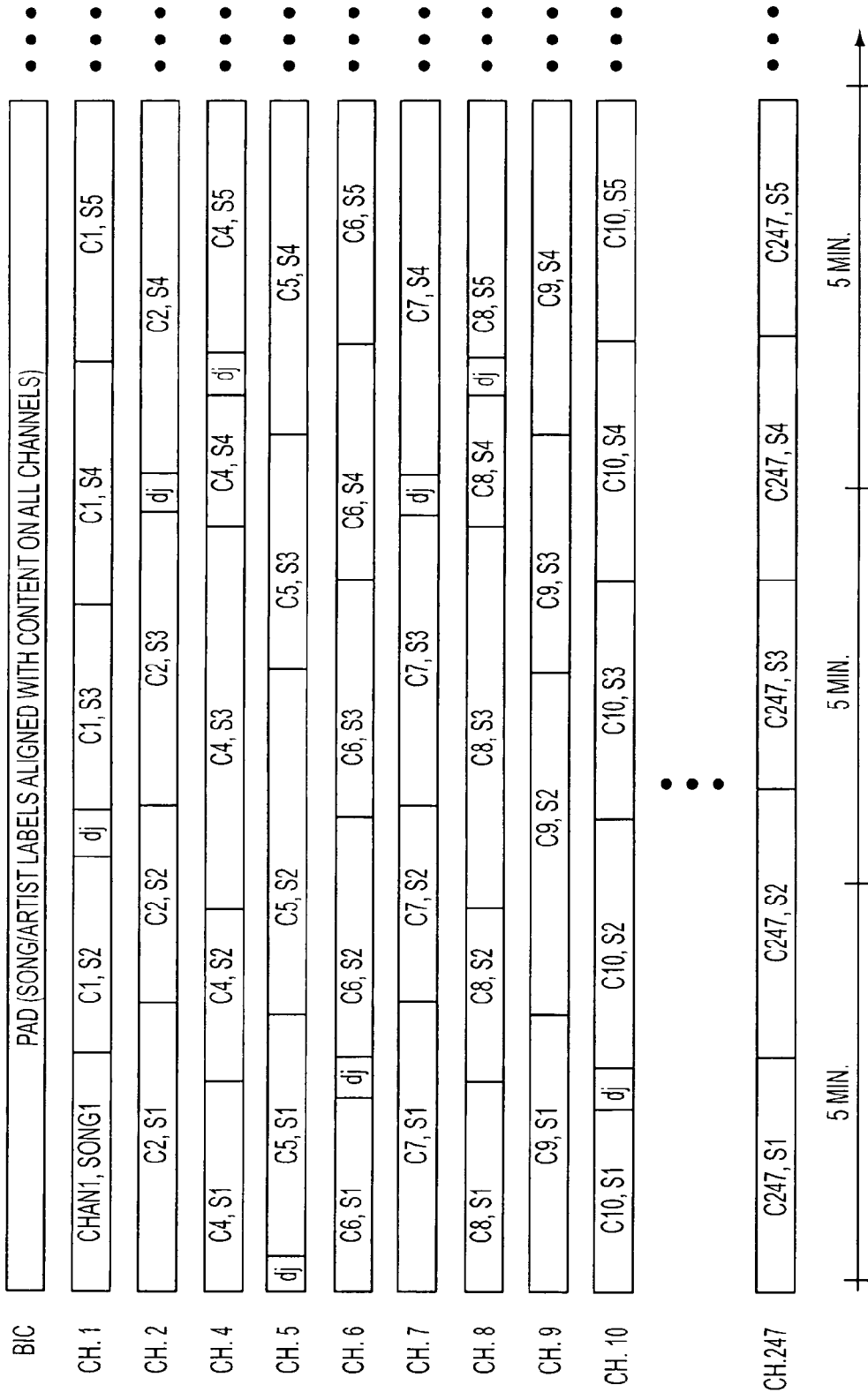
FIG. 2 depicts different program channels in a source stream from which channels can be selected or monitored for favorite content to build personalized radio channel playlists in accordance with an exemplary embodiment of the present invention.

FIG. 2 illustrates different service transmission channels (e.g., Ch. 1 through Ch. 247) providing the payload content and a Broadcast Information Channel (BIC) providing the auxiliary information. These channels are multiplexed and transmitted in a composite data stream that can be a source stream for a radio receiver 14 constructed in accordance with exemplary embodiments of the present invention. The illustrated payload channels comprise segments such as songs indicated, for example, as S1, S2, S3 and so on) and disc jockey (DJ) talk segments indicated as "dj" in FIG. 2.

The BIC includes auxiliary information useful for services selection and non-real-time control. The present invention is characterized by the additional advantages of leveraging this auxiliary information, which is already available in an SDARS composite data stream, for additional beneficial uses. First, the auxiliary information comprises data (e.g., Program Associated Data (PAD) described below) to facilitate locating the beginnings of songs for buffering and locating dj segments for exclusion from the personalized channel. Second, the auxiliary information in the composite data stream (e.g., PAD) allows a multi-channel demultiplexer in the receiver 14 to locate and buffer the selected channels, as well as favorite songs from other non-selected channels. The auxiliary information also allows a multi-channel demultiplexer in the receiver 14 to exclude from the personalized channel any disliked songs identified by the listener. The auxiliary information that relates music genres, channels and songs/artists in an SDARS is therefore a readily available tool with which to navigate the diverse content provided via SDARS for achieving a personalized listening experience. By contrast, extensive metadata must be procured by providers of conventional personalized radio services to enable selection of content for a listener.

More specifically, the BIC can be used to display the station name of available services, a directory to the contents of the composite data stream, as well as PAD. PAD can comprise data associated with a channel such as a song name or label, artist name or label, service ID (SID), and program ID (PID), among other data. The service ID is an identifier (typically 8 bits) which is associated with a specific SDARS provider radio service (e.g., for XM Satellite Radio, the SID can identify service channels such as Top Tracks, CNN News, The Comedy Channel, and the like) and is used identify the specific service channel at the receivers 14. The program ID comprises data relating to the identity of a unique content segment such as a song on a specific CD, for example. Thus, a change in PID and/or PAD can indicate to a receiver 14 the beginning of a song for that channel and facilitate buffering of the song for the personalized radio channel.

The present invention is advantageous since the channels are partitioned into segments, and the beginnings of segments in the multiple selected channels are located for buffering to generate the personalized channel. Thus, complete segments or songs are buffered for playback on multiple, simultaneously received channels that have been selected to create the personalized radio channel playlist. This is in contrast with scanning operations on conventional radios that often bring a listener to the middle or near end of a song that had not been buffered.

Figure 3:
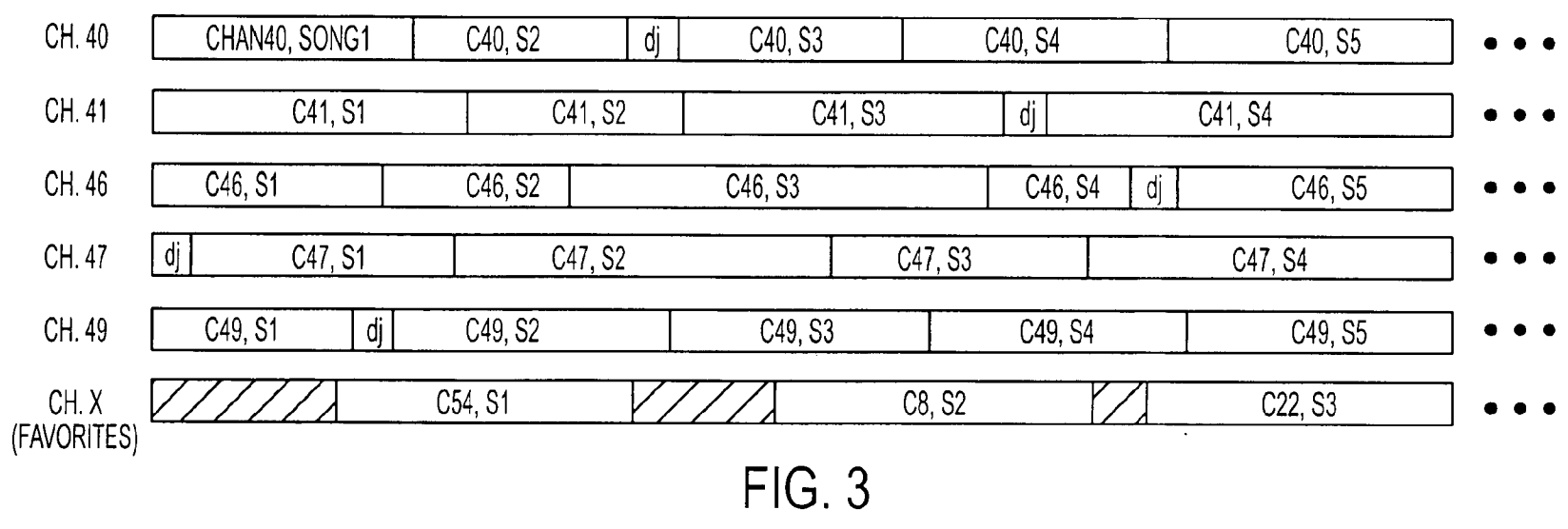

FIG. 3 depicts five exemplary simultaneously broadcast channels (e.g., Ch. 40, Ch. 41, Ch. 46, Ch. 47 and Ch. 49) from one or more source streams. In accordance with an exemplary embodiment of the present invention, the five channels are selected for essentially simultaneous extraction from the received source stream(s) and buffering in a memory 70 (e.g., a static random access memory (SDRAM)) in the radio receiver 14 for creating a personalized radio channel playlist. It is to be understood that a larger or fewer number of channels can be used to create the personalized radio channel playlist.

As stated above, one (or more) of extracted and buffered channels can optionally be a favorite channel. More specifically, the radio receiver 14 is programmed to receive user inputs indicating favorite songs or artists and to save some of the auxiliary information for those songs and/or artists as user favorites data. For example, as described below, a radio receiver 14 can be provided with a Thumbs Up button 32 that a user can depress while listening to a song. The radio receiver 14, in turn, stores user favorites data comprising artist and/or song information obtained from the BIC pertaining to that song. In accordance with an exemplary embodiment of the present invention, the radio receiver 14 monitors the BIC of the received stream(s) for content matching the user favorites data and then extracts and buffers the content for building the personalized radio channel playlist. The monitored channels encompass non-selected channels for the purpose of building the playlist and therefore increase the user's exposure to desirable content in the received source stream to beyond the selected multiple channels.

FIG. 4A depicts six selected channels for building a personalized radio channel playlist, which are essentially the same group of channels described with reference to FIG. 3 with the exception of a Ch. 50 being extracted in lieu of implementing a favorites channel. With regard to FIG. 4A, a playlist is derived from simultaneous reception of 6 real-time music streams. In the illustrated embodiment, the real-time streams are each 60 kilobits per second (kbps) for a total of 360 kbps of content from which to generate a playlist. Alternatively, the source stream can be a high speed stream (e.g., 360 kbps) constituted by songs from multiple channels that are transmitted faster than real-time (e.g., 6 times faster than 60 kbps), as shown in FIG. 4B.

Figure 5:
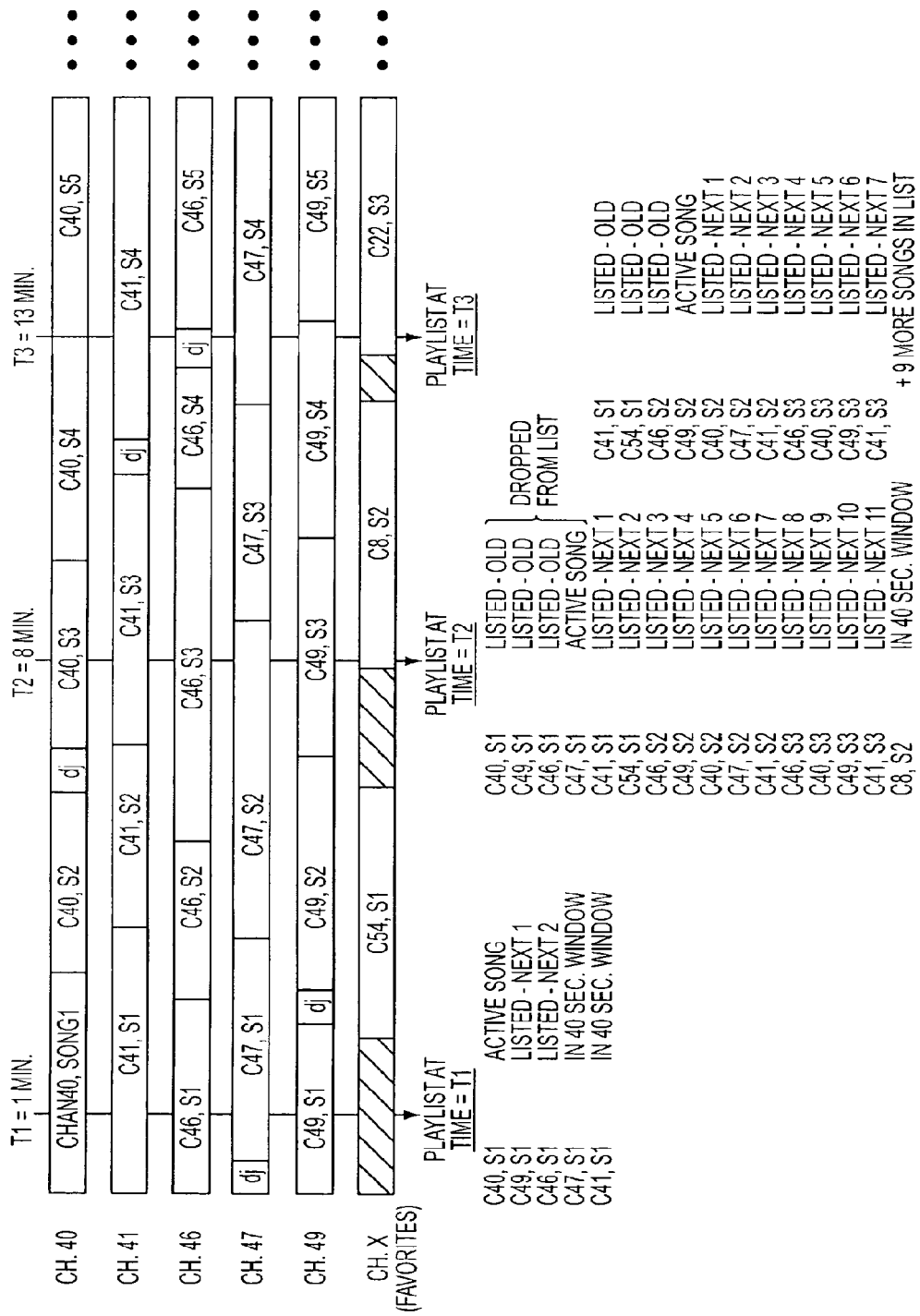
FIG. 5 depicts an illustrative playlist and its constituent selected channels at different times after power up of the radio receiver or selection of a different personalized radio channel configuration in accordance with an exemplary embodiment of the present invention.

In accordance with an exemplary embodiment of the present invention, the personalized channel playlist is generated by time division multiplexing the songs from up to six channels, for example, which enables the playlist to grow faster than real-time. FIG. 5 depicts the playlist at different times after power up of the radio receiver 14 or selection of a different personalized radio channel configuration (e.g., at one minute (T1), at 8 minutes (T2) and after 13 minutes (T3)). The radio receiver 14 preferably monitors the BIC for song or segment changes to locate the beginnings/ends of the songs/segments before buffering. As illustrated in FIG. 5, songs/segments are preferably buffered in the sequential order of their respective start times within the channels being buffered. Further, the radio receiver 14 is programmed to wait a selected time period (e.g., 40 seconds) after the start of a segment before buffering to determine (e.g., from the BIC) whether that segment contains DJ chatter or other content to be ignored and not added to buffer. For example, the radio receiver 14 can be configured to determine that a PAD label for a segment indicates that segment to be a song as opposed to a commercial that is ignored. As shown at time T1, the songs S1 on respective ones of channels Ch. 49 and CH. 46 are listed in sequential order in accordance with their start times following the active Song 1 on Ch. 40. The songs S1 on channels Ch. 47 and 41, however, are preferably not queued in the buffer until about 40 seconds after their start times. Not including short audio segments in the playlist provides one method to remove DJ chatter, commercials or other undesired content.

Assuming that radio receiver 14 start up has occurred or another personalized radio channel configuration has been selected just prior to T1, Song 1 on Ch. 40 has the first start time, followed by Song 1 on Ch. 49 and so on. These songs are preferably buffered by the radio receiver 14 in that order. Thus, at power on, the radio receiver 14 looks for a label change to indicate the start of a song on one of the multiple selected channels and begins building buffered playlist. After power down, the buffer is preferably erased. A flash memory 78 can be used to store buffered playlist segments from the most recent past use for retrieval at power up. A user can switch to another personalized radio channel configuration and start buffering for that selected configuration immediately without a power down operation. The newly buffered segments will overwrite those segments extracted using the previous personalized radio channel configuration.

With continued reference to FIG. 5, the buffered songs that constitute the personalized radio channel playlist are preferably added and dropped on a first-in-first-out (FIFO) basis. As stated above, at playlist start-up (i.e., at power up or initialization of a new playlist configuration, the radio receiver 14 will monitor for the first song/segment with the first start time after start up and then begin building the playlist buffer). As indicated at time T3 in FIG. 5, several of the songs that were available in the playlist at time T2 have been fully or partially played and subsequently dropped at time T3 and more songs have been added.

With reference to FIGS. 6, 7 and 8, the radio receiver 14 provides the user with the tools to see playlist song titles on a display 23, with preview functions to optionally play shortened segments of each song/segment or the full-length song/segment, and user control inputs to reverse and fast forward through the playlist. The exemplary control/user interface 22 depicted in FIG. 6 can be configured as soft keys and/or fixed keys on the radio receiver 14. Two exemplary display screens are depicted in FIGS. 7 and 8, respectively, for providing a single song data display screen and a song list display screen on a radio receiver display 23. The screens depicted in FIGS. 7 and 8 preferably constitute Display Modes A and B, respectively. Both Display Modes A and B provide common information such as the name of the personalized radio channel playlist, the channels from which the playlist content is extracted, playlist song titles and artists, the number of songs in the buffer queue, and the duration of time left before the song currently being played back to the user is changed. The Display Mode A displays the same information regarding the currently playing song in a larger format.

The song list display screen in FIG. 8 lists the song from the personalized radio channel playlist that is currently being played back to the user, as well as the previous song in the buffer and the next few songs in the buffer. The control interface 22 shown in FIG. 6, preferably comprises a next song button 24 and a previous song button 26 for scrolling through the list of songs shown on the song list screen of FIG. 8. Since the number of queued songs may be too large for listing in one display screen, the tuning dial 28 can be programmed to permit a user to change the display of queued songs (e.g., scroll through the next songs in the queue after or before the six songs listed in the screen shown in FIG. 8 depending on which direction the dial 28 is turned).

As discussed in connection with FIG. 5, the playlist is continually changing over time as more songs from the selected channels are added to the buffer and previously buffered songs are dropped from the buffer on a FIFO basis. Thus, the number of songs that can be skipped in the reverse direction on the playlist is limited (e.g., as many a three songs) as these songs are overwritten in the buffer. Nonetheless, the reverse operation of the radio receiver 14 is an improvement over conventional on-line personalized radio services that do not permit reverse or back up operations to play prior items on a generated playlist during preview, nor during full playback without first purchasing the item.

With continued reference to the control interface 22 illustrated in FIG. 6, a display mode button 30 is provided to toggle between the different display mode screens (e.g., between a Display Mode A as shown in FIG. 7 and a Display Mode B as shown in FIG. 8) to display all songs in the buffer or current song being previewed or listened to in full. Buttons are also provided to allow a user to indicate, when listening to a song being played back by the radio receiver 14, that the song should be added to the user favorites data for monitoring and extraction via a favorites channel as described above, or be blocked from being queued in the playlist. Thus, the user can employ the "Thumbs Up" and "Thumbs Down" buttons 32, 34 to build a filter using customer-created lists of favorite songs or artists when generating a personalized radio channel playlist at the radio receiver 14.

In order to expose the user to each song being played on the subset of channels in the currently selected personalized radio configuration, songs or talk segments in the buffered playlist are truncated in order to reduce the average time each segment is played. For example, if the playlist has grown to 10 or more songs, each new song may be played for 45 seconds and then terminated so that the next song in the playlist can start. During the song, the user has the option to listen to the full song or back up in the playlist to listen to a previous song. A button 36 is provided to enable a user to select playback of a full-length version of the currently playing song. The user may be provided with an audible alert around 5 or 10 seconds before a song is terminated as a reminder to select playback of the full length version if desired. A user can opt to play full-length versions of all songs in the playlist but would either lose buffered content that is replaced with new content before being previewed or lose new content that could not be buffered when the buffer is full, depending on the buffer management implementation. When playing the full length version of the song, the user may optionally save the song to a separate favorite song file in non-volatile memory (not shown).

As shown in FIGS. 7 and 8, the amount of time left in a currently playing song (i.e., for preview or full length playback) is provided as a countdown timer 38 on the display 22 to inform a user of the time remaining before the current song is truncated and playback of the next song in the queue begins. As described in more detail below, an algorithm for the countdown timer 38 can be a phase locked loop to ensure a selected number of songs remain in the buffer. For example, timer 38 can be speed up (e.g., less preview time per stored segment) when the buffer has grown to a selected amount or the number of channels used to create the personalized radio channel has increased (e.g., using 10 channels instead of 5), or slowed down (e.g., more preview time per stored segment) when a selected number of Fast Forward operations have occurred. This countdown function 38, which truncates the songs in the playlist for preview purposes, may be enabled and disabled by the subscriber.

For example, once the number of "next songs" (e.g., see songs queued after an active song in FIG. 5) in the buffer builds to a predetermined number of songs (e.g., 10 songs), the countdown timer 38 in the radio receiver 14 is initiated. If the number of channels is 5 and the average song is 3.5 minutes, the initial value of the countdown timer can be 210 seconds/5=42 seconds. This value may be set to a predetermined or otherwise fixed value or, as discussed previously, increased and decreased as the number of next songs in the buffer decreases or increases above or below predetermined thresholds. The time value is adjusted in order to maintain a predetermined number of next songs in the buffer.

In order to stop occasional repetition (e.g., buffering the same song being played on different channels), a duplicate filter can be deployed in accordance with an exemplary embodiment of the present invention. Each time a song is listed in the playlist, the same song is added to a blocked song list stored in the radio receiver 14 for the next 10 songs or other predetermined number of songs. This insures at least 10 different songs are presented in the playlist between any 2 repeated songs.

With continued reference to FIG. 6, a menu button 40 provides a user with other functions such as, for example, a purchase button for initiating a transaction to acquire a song in the playlist. The exemplary control interface 22 depicted in FIG. 6 can also have PreSet keys 42, 43, 44, 45 for selecting channels for individual playback or for selecting other multi-channel configurations. A Show Keypad button 41 can also be provided to display numeric soft keys to provide a user with a convenient method of entering numeric information such as a desired channel number.

As stated above, an exemplary embodiment of the present invention uses selected content from a broadcast stream (e.g., satellite or terrestrial delivery) based on personalized settings to build a local personalized content database, that is, a user selects multiple channels from among all of the channels that are broadcast simultaneously in a source stream for simultaneous buffering in a personalized radio channel playlist in a radio receiver 14. Thus, a user is exposed to the content on the multiple channels as it is received.

Another embodiment of the present invention provides for the autogeneration of a personalized radio channel playlist based on selection of one of several offered genre-based multiple-channel personalized radio configurations. For example, the different genre-based multi-channel personalized radio configurations can be broadcast in a control data channel that is separate from the individual audio channel streams, where each configuration includes a list of individual channels for the radio receiver 14 to simultaneously extract. These preset configurations are presented to the subscriber as special "fast track" channels, such that the subscriber can "tune" to them without requiring additional interaction. A user can change between personalized radio configurations and the radio receiver 14 will immediately commence buffering based on the channels in the newly selected personalized radio configuration without requiring a power down operation.

In addition, an embodiment of the present invention allows a user to select which channels are to be included in a customized personalized radio configuration as opposed to using a preset configuration. One of the selected channels in the configuration can be a favorites channel, that is, songs or segments that are extracted from non-selected channels because they have been identified by the user as a favorite (e.g., using the thumbs up button 32 during a previous reception of the song or segment) and stored in a favorites list at the radio receiver 14. The radio receiver 14 is also configured to allow users to specify their favorite channels for building personalized radio channel playlists.

Figure 9:
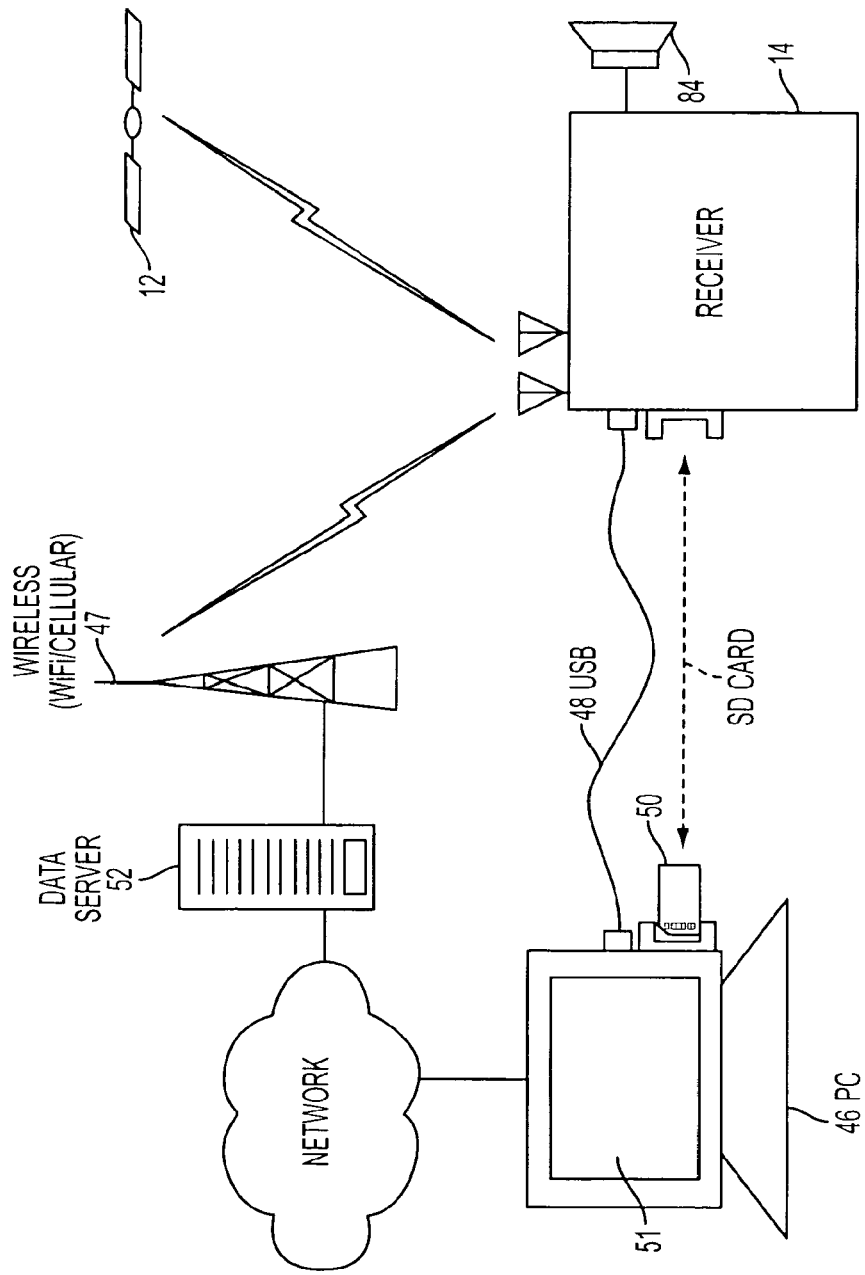
FIG. 9 depicts different optional methods for connecting a radio receiver having a multi-channel memory for buffering personalized radio channel playlists to other computing devices in accordance with an exemplary embodiments of the present invention.

Users have the options of entering favorite song/segment and/or channel information via the user interface 22 on the radio receiver 14 or via a personal computer 46 to which the radio receiver 14 can be connected in accordance with other embodiments of the present invention that facilitate customization of personalized radio channel configurations and sharing of customized playlist building configurations and favorites information (e.g., with friends and family members who enjoy similar broadcast content and may want to build similar personalized radio channels). With reference to FIG. 9, a radio receiver 14 having a multi-channel memory for buffering a personalized radio channel playlist is shown connected to a computing device 46 (e.g., a personal computer (PC)) using a number of different methods. The radio receiver 14 can transfer personalized radio channel configurations, lists of favorite channels, lists of favorite or banned songs and other multi-channel customization parameters to the computing device and receive similar information therefrom using one or more of these methods.

For example, a direct USB connection 48 can be provided between the radio receiver 14 and the PC 46. This is particularly useful if the radio receiver 14 is portable. A radio receiver 14 that is a dedicated car-installed unit can have a removable flash memory card 80 (e.g., a micro SD card) on which customized personalized radio configuration information is stored and corresponding interface. The micro SD card can then be used with a PC 46 or other car-installed radio receiver 14. Further, wireless technology 47 such as WiFi, WiMax and cellular interfaces can be used to call a radio receiver 14 with customized personalized radio information, and to scan and receive the configuration information for uploading through the wireless-enabled radio receiver 14 to a PC 46 or other player. The radio receiver 14 can optionally be connected wirelessly to a server 52. The channel configurations can be transferred or synchronized between the PC 46 and the radio receiver 14 as needed.

Figure 11:
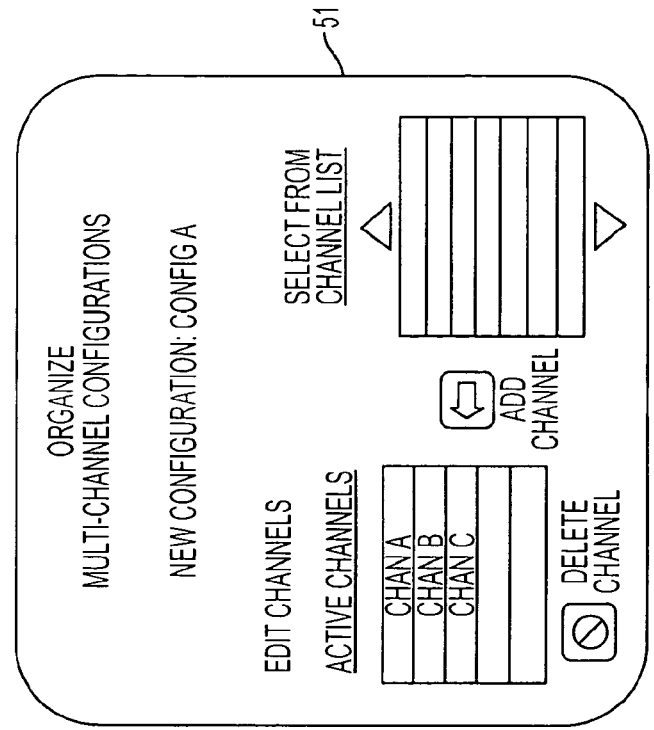
FIGS. 10 and 11 are illustrative web interface window for customization of personalized radio configuration parameters in accordance with an exemplary embodiment of the present invention.
Figure 10:
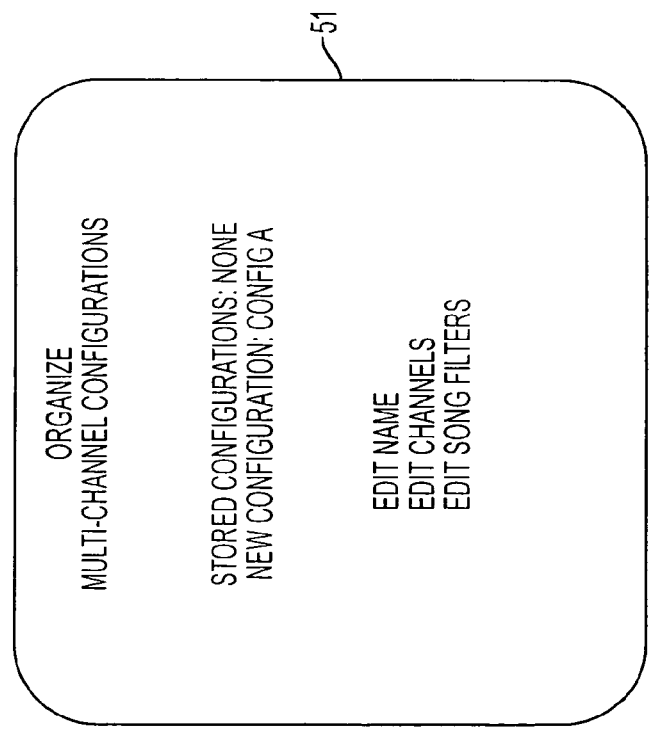

In accordance with another embodiment of the present invention, a web interface can be provided with user screens to allow users to create configurations and lists of favorite artists and songs for building a personalized radio channel that can be transferred to a device using, for example, a direct USB interface 48 or microSD card 50 or other portable memory device. FIGS. 10 and 11 are exemplary PC multi-channel customization screens or a PC display 51. FIG. 10 depicts a "Main Configurations" window that lists any currently stored personalized radio channel configurations and options for creating a new configuration (e.g., edit name, edit channels that constitute the new configuration, and edit song filters). FIG. 11 is an "Edit Channels" window that is displayed when the Edit Channels option is selected in the window depicted in FIG. 10. Active channels can be selected from a scrolling channel list that can include all broadcast channels in a source stream or favorite channels stored in the radio receiver 14. It is to be understood that other source streams can be selected from which channels can be selected and added to the active channels list.

An "Edit Song Filters" window (not shown) can be displayed when the Edit Song Filters option is selected in the window depicted in FIG. 10. The "Edit Song Filters" window is similar to the "Edit Channel" window in FIG. 11 in that the user may select specific songs or artists from a comprehensive list to add to either the "Favorites List" or the "Do Not Play List". As described above, the "Favorites List" is used for a background scan of all non-selected channels and, if a match is found, that song or artist is extracted and added to the playlist. The "Do Not Play List" filters the listed songs or artists out of the playlist.

In accordance with another embodiment of the present invention, the web interface 46 can be used to provide listener's audit information to the programming center 20. For example, patterns of listeners can be determined based on their selected configurations (e.g., music-genres, thumbs up/down operations 32, 34 and corresponding favorites and banned segments lists) which can be uploaded from their PCs 46 to the programming center 20 via the web.

Figure 12:
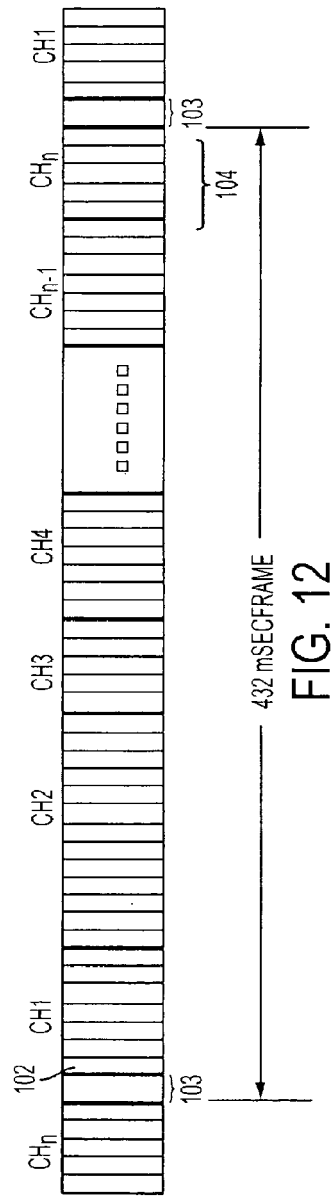
FIGS. 12, 13 and 14 are respective air interface formats for providing a source stream to a radio receiver in accordance with an exemplary embodiment of the present invention.

As stated above, the present invention allows users to build personalized radio channel playlists from selected channels in one or more broadcast source streams such as an SDARS transmission. FIG. 12 depicts an exemplary over-the-air protocol frame format for an illustrative source stream in which the payload channels and auxiliary information channel(s) are multiplexed for transmission to receivers 14. This frame format is based on a 432 millisecond frame where each frame includes a frame header 103 and is subdivided into 8 kilobit per second sub-channels 102. These sub-channels 102 can be dynamically grouped to form higher bit rate payload channels 104 (i.e., Channels 1 through n which may include the BIC). The payload channel 104 provides the necessary bandwidth to transport a high-quality digital audio signal to the listener. When a listener changes program channels on a receiver 14, the receiver 14 extracts a different payload channel 104 corresponding to that program channel from each frame.

Figure 13:
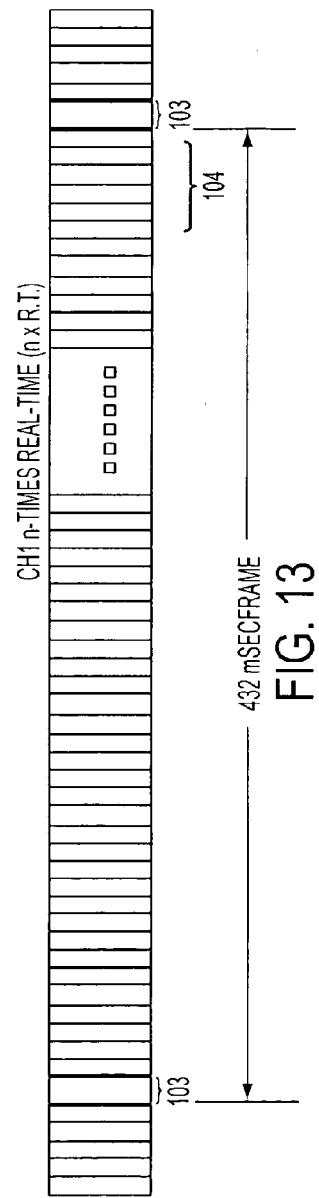
Figure 14:
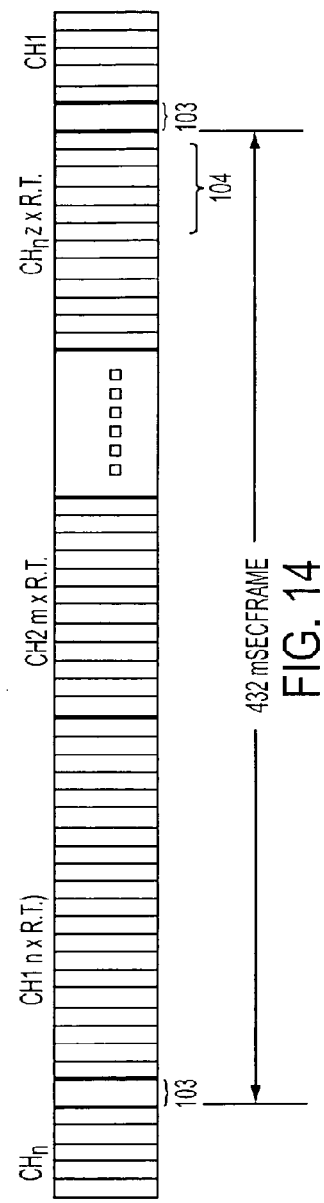

FIGS. 13 and 14 depict respective exemplary embodiments for additional air interface formats. FIG. 12 illustrates a time division multiplex of multiple real-time audio streams. FIG. 13 depicts an air interface for a single channel (e.g., Ch. 1) audio stream that is transmitted faster than real-time. FIG. 14 depicts an air interface for multiple single channel audio streams that are transmitted faster than real-time (e.g., Ch. 1, Ch. 2, . . . , Ch. n that are transmitted, respectively at rates n, m, . . . , z times faster than real-time). As described in connection with FIGS. 4B and 5, a channel transmitted using either of the air interface formats depicted in FIGS. 13 and 14 builds a personalized playlist more quickly that the air interface format depicted in FIG. 12.

Figure 15:
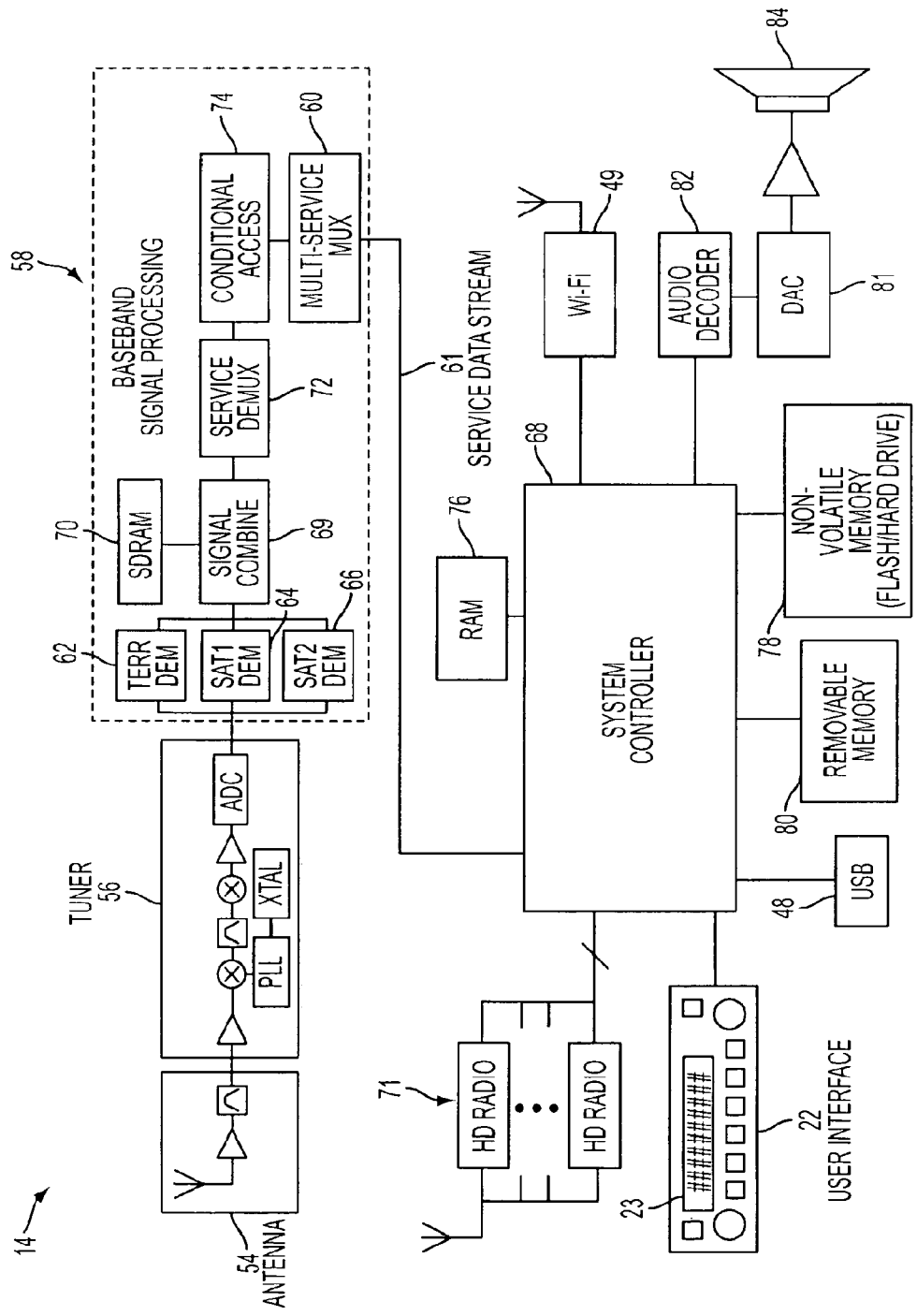
FIG. 15 block diagram of a receiver in accordance with an exemplary embodiment of the present invention.

An exemplary receiver 14 is depicted in FIG. 15. The radio receiver 14 preferably comprises an antenna 54 for receiving, for example, an SDARS signal and/or other broadcast streams, a tuner 56, baseband signal processing components indicated generally at 58, a system controller 68, a multi-service multiplexer MUX 60 and memory, among other components.

With further reference to FIG. 15, the receiver 14 preferably comprises three receiver arms for processing the SDARS broadcast stream received from two satellites 12, 16 and a terrestrial repeater 17, as indicated by the demodulators 62, 64, 66, that are demodulated, combined and decoded via the signal combiner 69 in combination with the SDRAM 70, and demultiplexed to recover channels from the SDARS broadcast stream, as indicated by the signal combining module 69 and service demultiplexer module 72. Processing of a received SDARS broadcast stream is described in further detail in commonly owned U.S. Pat. Nos. 6,154,452 and 6,229,824, the entire contents of which are hereby incorporated herein by reference. A conditional access module 74 can optionally be provided to restrict access to certain demultiplexed channels. For example, each receiver 14 in an SDARS system can be provided with a unique identifier allowing for the capability of individually addressing each receiver 14 over-the-air to facilitate conditional access such as enabling or disabling services, or providing custom applications such as individual data services or group data services. The demultiplexed service data stream 61 is provided to the system controller 68 from a multi-service multiplexer 60. In accordance with an embodiment of the present invention, the radio receiver 14 is provided with a memory (e.g., RAM 76 or 78) or a part of a memory that is a multi-channel memory for buffering the selected received and demultiplexed channels of the currently active personalized radio channel configuration.

The RAM 76 connected to the system controller 68 in FIG. 15 is used for buffering. Also, the system controller 68 may be enabled to provide a second level multiplexer to multiplex content from the satellite multi-service multiplexer, an HD receiver bank 71, a WiFi link 49, removable memory 80 and/or the non-volatile memory 78. Some specific examples include building the playlist from (1) one or more high speed HD radio stream(s), (2) multiple real-time HD radio streams, (3) a combination of high speed and real-time HD radio streams, (4) a high speed WiFi stream, (5) a combination of satellite radio stream(s), HD receiver stream(s), WiFi stream(s) and other wireless streams, or any of the previous source stream configurations in combination with locally stored content segments.

With further reference to FIG. 15, the system controller 68 receives a service data stream 61 from the multi-service MUX 60 and can provide selected, demultiplexed audio, speech and the like to an audio decoder 82 and digital to audio converter (DAC) 81 for playback via a speaker 84. The selected content can be based via user inputs to a user interface 22 as shown. The user interface 22 comprises a display 23 and input devices (e.g., buttons, dials) for selecting received program channels for playback and navigating buffered content in the playlist. For example, a user can opt to select one of the received channels for playback in a default playback mode, or select a personalized radio playback mode and use the display and buttons described with reference to FIGS. 6-8 to navigate and listen to segments from multiple buffered channels available in the playlist stored in the SDRAM based on the current personalized radio configuration.

With continued reference to FIG. 15, the radio receiver 14 can have a USB port 48 to allow settings and other operating data to be transferred between another device and the receiver 14 such as personalized radio multi-channel customization parameters as described above. A removable memory 80 and interface can also be provided such as a micro SD card to allow also transfer personalized radio multi-channel customization parameters, or a cartridge on which other buffered content is stored (e.g., acquired content, MyMusic content) for playback when reception of the live source stream is not available as described in commonly-owned U.S. patent application Ser. No. 11/239,642, filed Sep. 30, 2005. Finally, non-volatile memory 78 and random access memory 76 are preferably provided in the radio receiver 14 for use by the system controller 68 (e.g., for storing program code).

Figure 16:
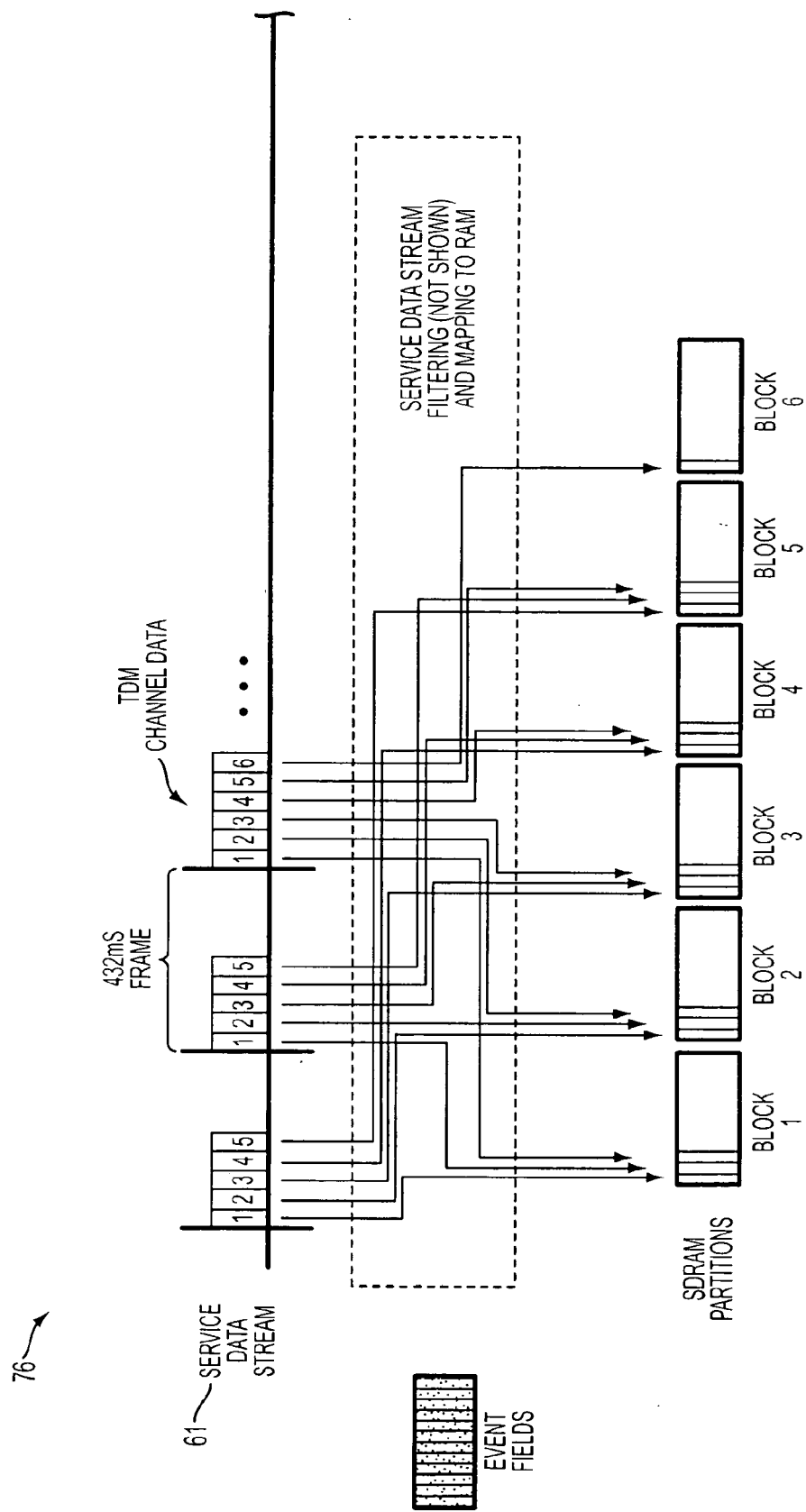
FIG. 16 illustrates buffering management in accordance with an exemplary embodiment of the present invention.

A RAM 76 for providing a multi-channel memory in accordance with an exemplary embodiment of the present invention is shown in FIG. 16 which could be implemented in any R/W memory technology such as a static RAM, SDRAM, DDRAM, embedded RAM or non-volatile memory block. The RAM device 76 is partitioned into 6 dedicated channel blocks indicated in FIG. 16 as Block 1 through Block 6. As frames of source data stream are received, each of 6 channels in a particular personalized radio channel configuration are extracted and mapped to a separate RAM memory block and recorded in circular buffer format, with the exception that buffering shall momentarily halt to prevent overwriting previous content in the active playlist or writing content which is listed on the do-not-play list. Pausing playback of a playlist song is allowed, as well as reverse or backtracking operations (e.g., limited to 3 songs).

Figure 17:
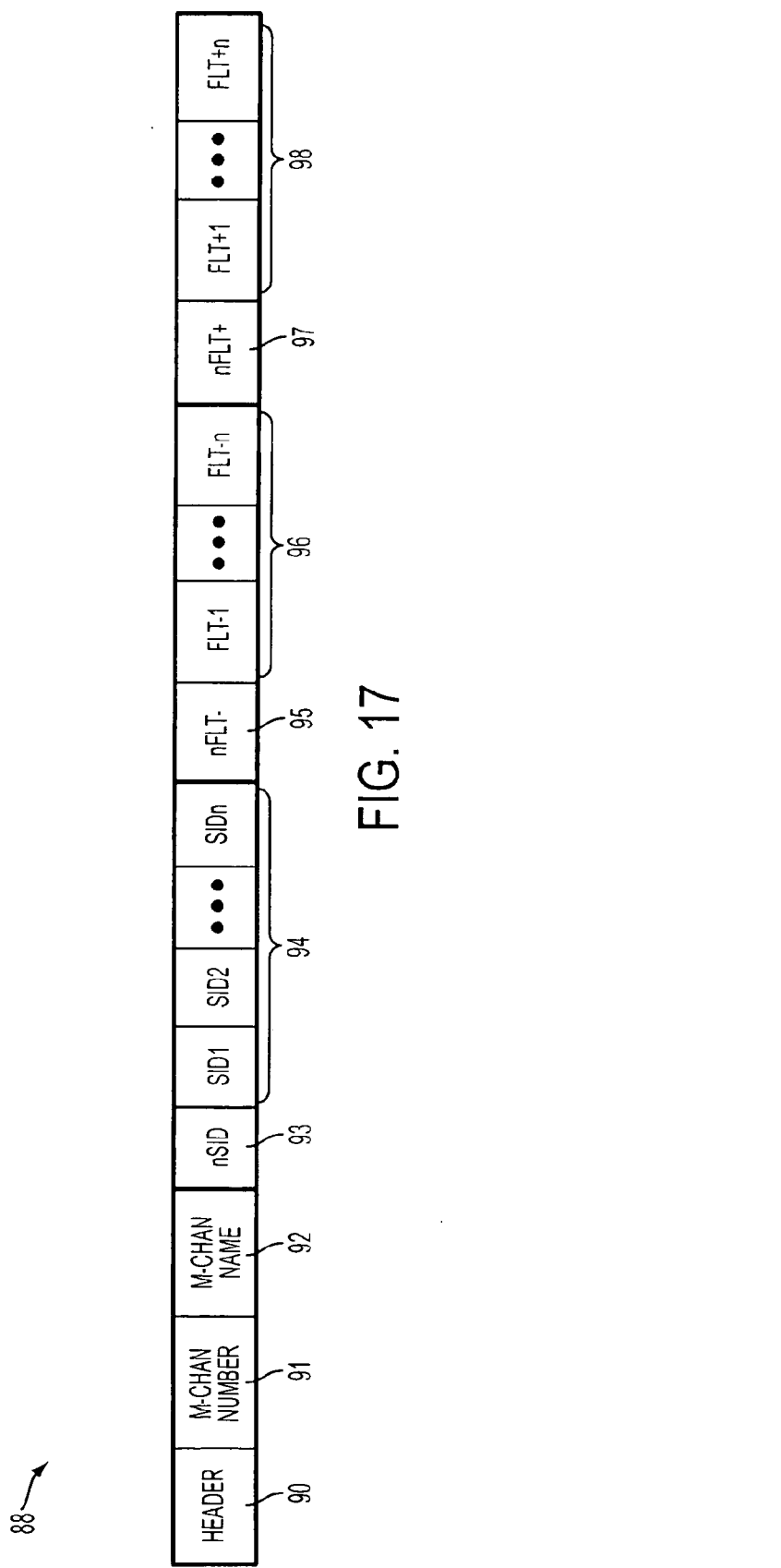
FIG. 17 illustrates a broadcast multi-channel configuration message in accordance with an exemplary embodiment of the present invention.

In accordance with another embodiment of the present invention, predetermined personalized channel configurations can be broadcast to receivers 14 and presented to users to simplify accessibility to the service. BIC messages 88 can have different formats and functions. The BIC can be used, in accordance with an exemplary embodiment of the present invention, to send different personalized channel configurations to receivers 14 (e.g., a different group of preselected channels that constitute a preset personalized channel configuration). An exemplary BIC message 88, that is, a broadcast multi-channel configuration message, is shown in FIG. 17. The broadcast multi-channel configuration message 88 enables the service provider to define tunable presets which contain channel configurations and filters necessary to enable a receiver 14 to automatically configure itself to build a playlist in accordance with the present invention. The receiver 14 receives the broadcast configuration message 88 and enables the subscriber to tune to the configuration by presenting a special multi-channel name and number or genre preset or equivalent in either the normal channel line-up or in a separate category or tuning window. Different multi-channel configurations may be broadcast based on genres, music/talk mixes, and so on. The message 88 can comprise the following fields:

Header 90: a message header identifying the message 88 as a multi-channel definition message;

M-Chan Number 91: the channel number to tune the radio receiver 14 to in order to receive this playlist configuration;

M-Chan Name 92: the name to display for this playlist configuration;

nSID 93: the number n of Service IDs (SID) or channels to simultaneously extract to build this playlist;

SIDx 94: each service listed separately which is to be extracted;

nFLT−95: the number of specific songs or artists to exclude from the playlist for this configuration FLT-x 96: each specific song or artist listed separately which will be excluded from the playlist (note: this field may be in the form of song/artist IDs or in text format);

nFLT+97: the number of specific songs or artists which will be used to search other channels (e.g., if one of these songs or artists are found on another channel, that song or artist will be extracted and added to the playlist); and FLT+x 98: each specific song or artist listed separately for the background channel search (note: this field may be in the form of song/artist IDs or in text format).

Figure 18:
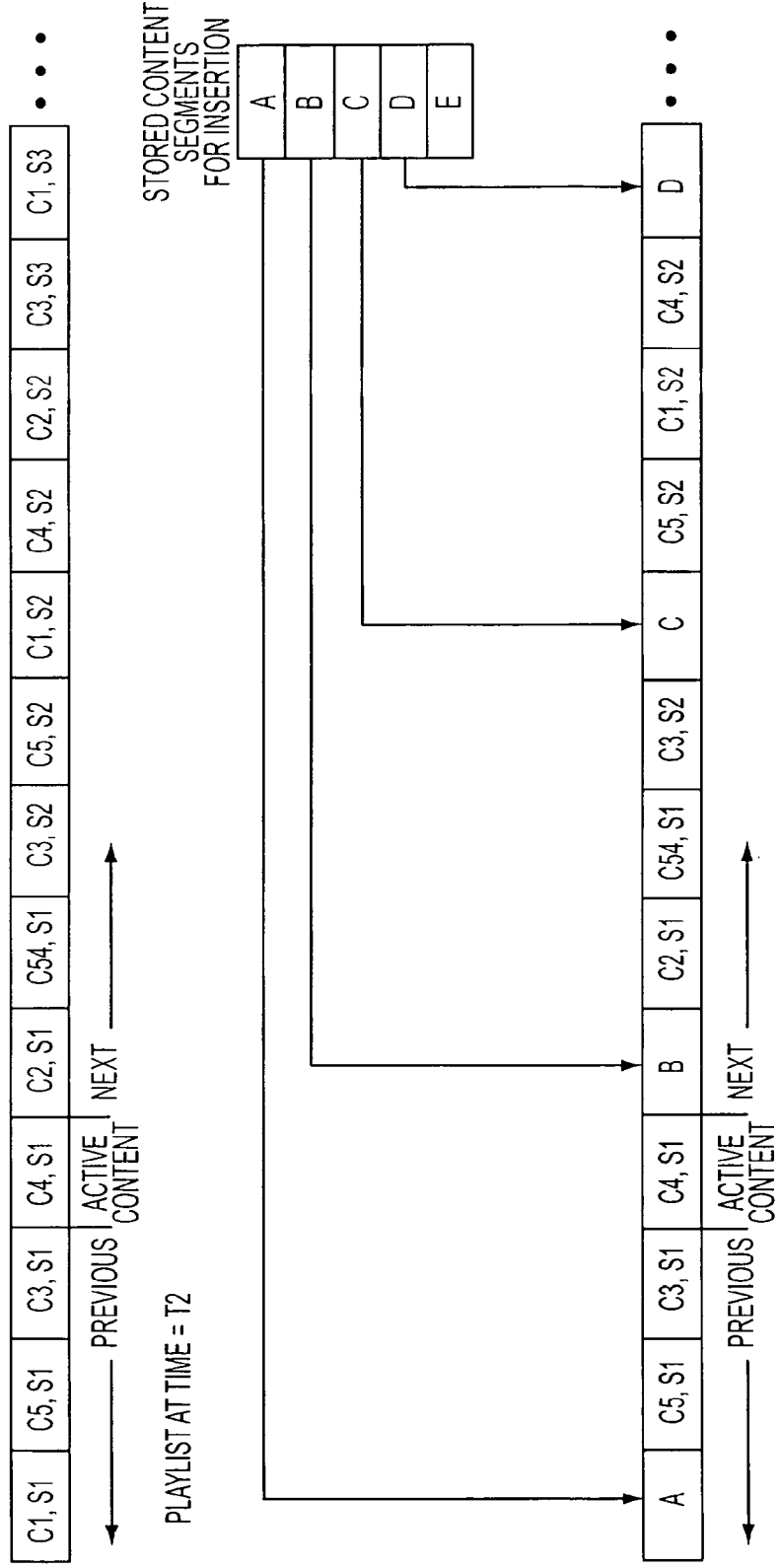
FIG. 18 illustrates personalized radio channel playlist management with content insertion in accordance with an exemplary embodiment of the present invention.

With reference to FIG. 18, in accordance with another embodiment of the present invention, the buffered playlist of a personalized radio channel can be subject to content insertion. For example, a radio receiver 14 can store content segments for insertion among the playlist segments such as commercials. The radio receiver 14 can be programmed to insert selected content insertion segments (e.g., segments A, B, C and D) at selected points among the queued playlist segments. The radio receiver 14 can be programmed to only play the full-length version of the inserted content segment as opposed to the truncated preview version. The radio receiver 14 can also be controlled to limit a user's ability to skip inserted content segments. Such control could be used to limit the ability to skip certain content segments, such as commercials, or to limit the number of skips allowed over a preset period of time.

Additional exemplary embodiments of the present invention will now be described with reference to FIG. 19. FIG. 19 is similar to FIG. 2 described above except for FIG. 19 also illustrating a data channel(s) indicated generally at 100. As will be described below, the data channel(s) 100 facilitate generation of personalized playlists at receivers 14 based, for example, on filter data corresponding to real-time user inputs indicating user preferences for music, or on broadcast control messages indicating broadcast stream music segments that are selected at the uplink for playback by receivers tuned to a predetermined personalized channel or Auto Track.

Figure 19:
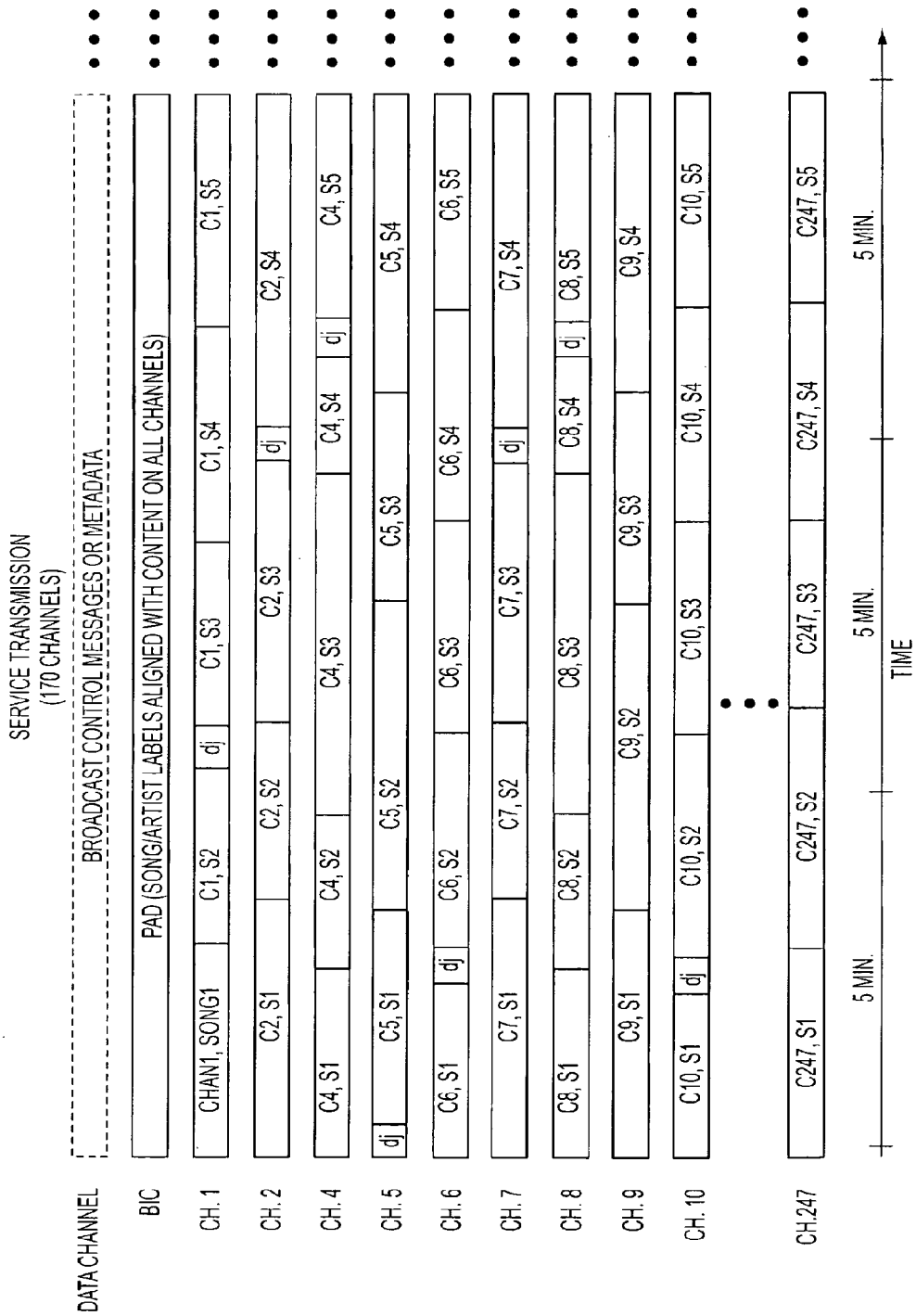
FIG. 19 depicts different program channels and a data channel in a source stream, the data channel comprising broadcast control messages or metadata to control selection of music segments from the program channels to build personalized radio channel playlists in accordance with exemplary embodiments of the present invention.

In accordance with an exemplary embodiment of the present invention, the data channel(s) 100 in FIG. 19 can comprise descriptive metadata for each song that is transmitted in a source stream(s) to facilitate extraction and storage of selected music segments (e.g., or songs) from the one or more received streams to generate a personalized radio channel playlist. The source stream can be, for example, an SDARS stream comprising multiple program channels with music segments. The descriptive metadata is preferably transmitted on a separate data channel 100 from the program channels and in advance of the corresponding songs' content transmitted in the source stream. It is to be understood, however, that the descriptive metadata can be provided within the program channels as opposed to a separate data channel, in a separate stream as opposed to being transmitted in the source stream, in advance of or concurrently with or after the corresponding song, or via a look-up operation (e.g., an index to the data or merely a song identifier is transmitted for facilitating look-up of the descriptive metadata by the receiver 14), among other methods, depending on the processing speed and memory utilization at the receiver 14.

The descriptive metadata for the active songs in the source stream is used with filter data created based on user preference inputs to identify, extract and store songs from the source stream(s) for generating the personalized radio channel playlist. For example, a subscriber can build a personalized music filter with simple input commands such as by pressing thumbs up or thumbs down keys (e.g., keys 32 and 34 shown in FIG. 6) during a song that is being played back from the received source stream(s) to enter filter data into a receiver memory such as any of the memories 76, 48, 80 or 78 shown in FIG. 15 (e.g., SD card 50 shown in FIG. 9). This entry of filter data may be achieved through the use of existing input buttons on a radio receiver 14 (i.e., programming existing control buttons used for scrolling and selecting menu options to operate as filter buttons in a filter mode of operation) or the use of dedicated input buttons such as keys 32 and 34 shown in FIG. 6.

The filter data preferably consists of the descriptive metadata for the tagged song, that is, the song being played back from the received stream that prompted the user to indicate approval or disapproval of the song using the programmed existing control buttons or dedicated buttons such as the keys 32 and 34. The metadata for all active songs in a broadcast stream (e.g., the 70 music channels among the 100 or so channels of audio content provided via an exemplary SDARS) is correlated with the filter data. If the correlation factor exceeds a predetermined threshold, the song is saved to a personalized channel buffer as described above in connection with FIG. 5, for example. Songs characterized by musical metadata that exceed a correlation threshold with the filter data can be simultaneously buffered from multiple concurrent channels (e.g., such as when a broadcast stream comprises multiplexed audio program channels) such as simultaneously saving up to 6 songs from 6 respective channels in a received multiplexed source stream.

In addition, correlating the descriptive metadata of active songs in a source stream with filter data is preferably performed as the music segments in the plurality of multiplexed audio program channels of the source stream(s) are being received. Further, generating the playlist preferably comprises contemporaneously multiplexing and storing the music segments, whose correlation factors exceed a selected threshold, as they are received.

A user or subscriber preferably tunes the receiver 14 to a personalized channel to hear the filtered buffered songs that constitute the playlist. The buffered songs are preferably cleared on each power cycle of the receiver 14. As stated above, the buffered playlist songs are preferably stored as of their respective start times in the source stream. Audio segments comprising "DJ chatter" are preferably not stored in the playlist buffer. The buffered songs that constitute the playlist are preferably added and dropped on a FIFO basis and can be navigated by the user, as described above.

The database of metadata is preferably stored so as to be accessible by an uplink facility or other transmission system(s) for the source stream(s) such as the programming center 20 in FIG. 1, as well as a database comprising a library of songs and other audio content available for transmission on the source stream(s). The uplink facility or other transmission system selects content from the library for transmission on the various program channels and multiplexes the audio content into the source stream(s) for transmission. The database of metadata is then accessed to obtain the corresponding descriptive metadata for the respective songs selected for transmission on the program channels. As stated above, a data channel 100 comprising the descriptive metadata for the selected songs can be sent with the source stream(s) and is preferably synchronized so that the descriptive metadata for each of the respective transmitted songs is sent in advance of its corresponding song by a selected amount of time.

The descriptive metadata can be implemented a number of different ways. The descriptive metadata is preferably musical metadata that comprises at least some song bibliographic attributes (e.g., artist, length) and at least some song composition attributes or features (e.g., genre, form, style, tempo, arrangement or composition, key, instrumentation, melody, harmony, rhythm, and so on). For example, a descriptive metadata database can be purchased from a commercial source such as AMG or All Media Guide or from another source, in which case the metadata database is immediately available for integration with audio content library. Such a metadata database is updated as needed as new material becomes available for transmission. Alternatively, a custom descriptive metadata database can be created by purchasing song characterization software and using it for each of the songs in the library, in which case characterization data for new material is immediately available that might not otherwise be if a commercially-available metadata database were used instead. The filter data created in response to user inputs at the receiver 14 can be all or a subset of the metadata attributes available for content in the metadata database.

Exemplary data channel 100 bandwidth requirements will now be discussed. The descriptive metadata contents for each song can be selected such that 25 features or attributes are used with 4 bytes needed per feature (i.e., 800 bits). Thus, a song metadata message that can be created and sent via the channel 100 can have a length of 850 bits allowing for overhead bits. In an exemplary SDARS system, messages are sent for the 70 music channels and songs are assumed to change approximately every 3.5 minutes. Accordingly, average bandwidth for descriptive metadata for 70 songs concurrently in the multiplexed program channels of the source stream is (850 bits×70)/(3.5×60 sec) or 284 bits per second (bps). To accommodate retransmissions and peak loads, a bandwidth for the descriptive metadata for all music channels is preferably at least 2 kbps.

In accordance with another exemplary embodiment of the present invention, the intelligence of determining what songs are to be included in the playlist is bounded to the uplink or transmission facility (e.g., programming center 20) and not the receiver 14. This embodiment simplifies receiver 14 implementation, and the uplink or transmission system can be upgraded over time to implement new algorithms for selecting songs for the playlist.

For example, the programming center 20 can select custom program channel playlists (herein after referred to as "Auto Tracks" or simply "Tracks") based programming team's definitions. Based on these definitions, the uplink or transmission system 20 monitors songs on all channels that will be broadcast or otherwise transmitted on source stream(s) ahead of time (e.g., a few minutes before transmission) and determines which songs meet the definitions for a particular one or more Auto Tracks. The uplink or transmission system then composes and broadcasts or otherwise sends control messages to the receivers 14 that identify the songs for each Track. The broadcast control messages are preferably transmitted on the data channel 100 that is separate from the program channels as shown in FIG. 19, and in advance of the corresponding songs' content transmitted in the source stream. It is to be understood, however, that the broadcast control messages can be provided within the program channels as opposed to a separate data channel, in a separate stream as opposed to being transmitted in the source stream, or in advance of or concurrently with or after the corresponding song, among other methods, depending on the processing speed and memory utilization at the receiver 14. The identification of songs for a particular Auto Track can be provided as a separate message or combined in a single message with identification of songs selected for other Auto Tracks.

The receivers 14 receive and process these Track control messages. If a listener or user has selected a specific Track for playback, the receiver 14 buffers and plays the songs that belong to that Track as indicated by the control messages into a playlist buffer in a manner described above in connection with FIG. 5.

The Auto Tracks can be based on themes or celebrity musician names such as a mostly Rock theme with primarily songs sampled from the Rock genre, along with some songs from a current Hits list and a few songs from a Jazz genre. A celebrity's picks can also be used as a theme for selected songs for a selected playlist at the receivers 14. For example, an Auto Track can be defined at the programming center 20 to be "Dylan's Picks," that is, if Bob Dylan were listening to music such as an SDARS service, what song would he be listening to? Based on the songs that meet the defined theme or celebrity preference, other songs with similar characteristics or attributes can be located within the source stream using, for example, descriptive metadata.

Algorithms for song selection (hereinafter referred to as the "Uplink Song Picker") are preferably employed at the uplink or transmission system, as opposed to the receivers 14. The algorithms can be based on such industry technology as that provided by Pandora internet radio, the Music Genome Project, and other similar music analysis and selection services for locating music to meet users' preferences. As stated above, a database can be employed that contains the metadata for the song picker algorithm technology of choice. For Celebrity-based Tracks, the Uplink Song Picker is trained for each celebrity for whom an Auto Track is offered at the receivers 14. In other words, a celebrity can sit down for an hour or so on an uplink facility programming console and select favorite songs from the SDARS service library containing songs and other audio content available for transmission database. The song picker algorithm then selects other songs based on this initial input. In essence, this initial input can be the initial generation of a filter for that Auto Track that is similar to the filter described above, only it is generated for use at the uplink or transmitter and not the receiver 14. The metadata or characterization data of the filter can then be correlated with metadata provided (e.g., from a database) for each song in the source stream to determine if the definition or criterion for an Auto Track is met. In addition, the uplink song picker can be passive or proactive. In other words, the uplink song picket can be passive and simply monitor songs being transmitted on the program channels to determine if any songs met the Auto Track definitions or criteria. Alternatively, the uplink song picker can be extended to influence song selection on of the program channels in a proactive manner. For example, if no songs selected for transmission met any of the Auto Track criteria, then the uplink song picker can select one or more songs that do met the criteria for at least one Auto Track and request that it be inserted or programmed on a program channel for transmission.

Exemplary data channel bandwidth requirements for the broadcast control messages will now be described. The total number of Auto Tracks is preferably bounded to an upper limit such as 32. The Track song titles change over time, along with the songs selected and transmitted in the programmed channels of the source stream(s). A selected amount of information is used to identify each song that is determine to meet the definition for a particular Auto Track. For example, 10 bytes of information can be used per song designated for an Auto Track, including Auto Track ID, Program ID, SID, Time Window, and so on. In an exemplary SDARS system, there are 70 music channels and songs are assumed to change approximately every 3.5 minutes. Accordingly, average bandwidth for a broadcast control message can be (80 bits×70)/(3.5×60 sec) or 27 bps, assuming that 70 songs concurrently in the multiplexed program channels of the source stream meet the definition of at least one Auto Track. To accommodate retransmissions and peak loads, at least 200 bps of bandwidth is allocated for broadcast control messages. If the Song Picker determines that more than one concurrent song (e.g., current songs on different program channels) in the source stream have descriptive metadata that meet the definition of the same Auto Track, either all of an upper limit of the songs are included in the broadcast control message for buffering in the playlist for that Auto Track or only the song with the greater correlation factor is used.

It is to be understood that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to a certain embodiment thereof, it will be understood by those skilled in the art that various changes in form and details may be made therein without departing from the spirit and scope of the invention. Consequently, the scope of the invention should not be limited to the embodiment, but should be defined by the appended claims and equivalents thereof.

What is claimed is:

1. A method of generating a playlist from one or more received broadcast streams comprising:
   receiving at least one broadcast stream comprising a plurality of multiplexed audio program channels, each of the audio program channels comprising audio segments for reception by all receivers configured to receive the at least one broadcast stream;
   receiving at least one user input indicating at least one of approval and disapproval of an audio segment that is currently being played back from among the audio segments in the received broadcast stream;
   generating filter data using the at least one user input and data corresponding to the audio segment that prompted that at least one user input;
   extracting selected ones of the audio segments from the audio program channels as they are being received in the received at least one broadcast stream based on the filter data;
   generating a playlist by multiplexing and storing the extracted audio segments; and
   automatically playing back the playlist to a user, wherein the user can listen to a current audio segment and back up in the playlist to listen to a previous audio segment, and wherein playback of the audio segments in the playlist includes a preview mode such that truncated versions of the audio segments can be played back.

2. A method as claimed in claim 1, further comprising the step of:
   receiving metadata comprising characterization data for the audio segments in the at least one broadcast stream that correspond to music segments;
   wherein generating filter data comprises using the at least one user input and the metadata corresponding to the audio segment that prompted that at least one user input to generate the filter data.

3. A method as claimed in claim 2, wherein generating the filter data comprises, in response to at least one user input during play back of an audio segment, storing metadata corresponding to that played back audio segment as part of the filter data.

4. A method as claimed in claim 2, wherein generating filter data further comprises:
   at least partially combining and storing the metadata corresponding to a plurality of the audio segments that were being played back and which prompted a respective at least one user input.

5. A method as claimed in claim 4, further comprising updating the combined and stored metadata with the metadata corresponding to the audio segments that are played back over time and that prompt the at least one user input.

6. A method as claimed in claim 1, wherein at least one of the filter data comprises descriptive metadata for a plurality of audio segments that have prompted the at least one user input that is accumulated and wherein the descriptive metadata is accumulated and analyzed over time to identify trends; or the filter data comprises descriptive metadata for a plurality of audio segments that have prompted the at least one user input that is accumulated, the descriptive metadata is accumulated and analyzed over time to identify trends, and the trends correspond to different filter data applied for different music genres.

7. A method as claimed in claim 2, wherein the metadata for respective ones of the audio segments is sent in advance of the broadcast of the corresponding audio segments.

8. A method as claimed in claim 7, wherein the metadata is sent in the at least one broadcast stream.

9. A method as claimed in claim 1, wherein the audio segments correspond to different genres of music and the generating of filter data comprises generating different filter data for each of two or more genres of music.

10. A method as claimed in claim 2, wherein extracting further comprises:
    correlating the metadata for the music segments in the plurality of multiplexed audio program channels with the filter data to determine a correlation factor; and
    extracting the music segments for which the correlation factor exceeds a selected threshold.

11. A method as claimed in claim 10, wherein at least one of:
    the correlating is performed as the music segments in the plurality of multiplexed audio program channels are currently being received, and generating the playlist comprises contemporaneously multiplexing and storing the extracted music segments as they are received; or
    two substantially contemporaneous music segments in the received broadcast stream each have a correlation factor that exceeds the selected threshold and extracting comprises at least one of picking one of the two music segments for storage that most exceeds selected threshold and storing both of the two music segments.

12. A method as claimed in claim 1, wherein generating a playlist comprises listing the extracted audio segments for playback in the order of the respective start times of the audio segments in the broadcast stream.

13. A method as claimed in claim 12, wherein generating a playlist comprises storing the extracted audio segments from their respective start times to allow playback from the beginning of each of these audio segments.

14. A method as claimed in claim 12, wherein generating a playlist comprises:
    providing a user with navigation control inputs to scroll forward and backward in the playlist to see the currently stored audio segments, and to select and playback the audio segments in the playlist, to expose a user to the audio segments in the extracted set of channels even when they are being presented simultaneously in the received broadcast stream.

15. A method as claimed in claim 1, further comprising providing a user with a control input to select and playback a full length version of one of the audio segments.

16. A method as claimed in claim 1, wherein generating a playlist further comprises buffering the multiplexed audio segments on a first in first out (FIFO) basis and writing over the stored audio segments as new audio segments are received via the at least one broadcast stream.

17. A method as claimed in claim 16, wherein generating a playlist comprises:
buffering the audio segments from the extracted set of channels on a first-in-first-out (FIFO) basis; and
managing buffer capacity by discarding new audio segments in the set of channels that are currently being extracted from the received broadcast stream when the buffer reaches a predetermined threshold of content waiting to be consumed.

18. A method of generating a playlist from one or more received broadcast streams comprising:
transmitting at least one broadcast stream comprising a plurality of multiplexed audio program channels, each of the audio program channels comprising audio segments for reception by all receivers configured to receive the at least one broadcast stream, wherein the audio segments in the at least one broadcast stream that correspond to music segments are associated with metadata comprising characterization data for respective ones of the music segments;
defining at least one predetermined music track for playback at the receivers, the at least one predetermined music track providing the receivers with selected ones of the music segments in the broadcast stream that match at least one of a predetermined theme and criterion;
determining metadata parameters corresponding to the at least one of a predetermined theme and criterion;
determining which of the audio segments in the broadcast stream correspond to the metadata parameters;
transmitting broadcast control messages to the receivers that identify the audio segments in the broadcast stream received by the receivers that correspond to the metadata parameters, the receivers being operable, when they are tuned to the at least one predetermined music track, to extract the audio segments that correspond to the metadata parameters as they are received, and to store and playback the extracted audio segments as a playlist,
wherein during said playback, the receiver is operable to automatically playback the playlist in the order received, or, in response to user input during playback of a given audio segment in the playlist, play an audio segment back up in the playlist, and
wherein playback of the audio segments in the playlist includes a preview mode such that truncated versions of the audio segments can be played back.

19. A method as claimed in claim 18, further comprising:
storing audio segments available for transmission on the at least one broadcast stream and the metadata for the respective audio segments; and
selecting which of audio segments are to be transmitted on the plurality of multiplexed audio channels in the at least one broadcast stream;
wherein determining which of the audio segments in the broadcast stream correspond to the metadata parameters comprises:
monitoring the selected audio segments for transmission via the at least one broadcast stream prior to transmission to determine which of the selected audio segments has metadata that corresponds to the metadata parameters corresponding to the at least one predetermined music track; and
providing identification data in the broadcast control messages for the selected audio segments having metadata that corresponds to the metadata parameters for the at least one predetermined music track.

20. A method as claimed in claim 19, wherein monitoring comprises:
correlating the metadata for the selected audio segments for transmission with the metadata parameters to determine a correlation factor; and
identifying, from among the selected audio segments for transmission, those audio segments for which the correlation factor exceeds a selected threshold.

21. A method as claimed in claim 19, wherein defining the at least one predetermined music track comprises selecting a plurality of audio segments from among the audio segments available for transmission; and determining metadata parameters comprises analyzing the metadata for each of the plurality of audio segments to determine the metadata parameters that will locate similar audio segments selected for transmission.

22. A method as claimed in claim 18, further comprising:
receiving the at least one broadcast stream;
receiving the broadcast control messages;
extracting the audio segments from among the plurality of program channels in the broadcast stream identified in the broadcast control messages;
storing the extracted audio segments; and
playing back the stored audio segments when the receivers are tuned to the at least one predetermined music track.

23. A method as claimed in claim 22, wherein storing comprises generating a playlist by multiplexing and storing the extracted audio segments.

24. A method as claimed in claim 22, wherein:
extracting comprises extracting each of the audio segments from their corresponding program channels in the received broadcast stream as they are received; and
storing comprises generating a playlist by contemporaneously multiplexing and storing the audio segments in the extracted set of channels as they are received.

25. A method as claimed in claim 23, wherein generating a playlist comprises listing the extracted audio segments for playback in the order of the respective start times of the audio segments in the at least one broadcast stream.

26. A method as claimed in claim 25, wherein at least one of:
generating a playlist comprises storing the extracted audio segments from their respective start times to allow playback from the beginning of each of these audio segments; or
generating a playlist comprises providing a user with navigation control inputs to scroll forward and backward in the playlist to see the currently stored audio segments, and to select and playback the audio segments in the playlist, to expose a user to the audio segments in the extracted set of channels even when they are being presented simultaneously in the received broadcast stream.

27. A method as claimed in claim 18, further comprising providing a user with a control input to select and playback a full length version of one of the audio segments.

28. A method as claimed in claim 23, wherein generating a playlist further comprises buffering the multiplexed audio segments on a first in first out (FIFO) basis and writing over the stored audio segments as new audio segments are received via the at least one broadcast stream.

29. A method as claimed in claim 28, wherein generating a playlist comprises: buffering the extracted audio segments on a first-in-first-out (FIFO) basis; and managing buffer capacity by discarding new audio segments that are currently being extracted from the received broadcast stream when the buffer reaches a predetermined threshold of content waiting to be consumed.

30. A method as claimed in claim 1, wherein extracting comprises extracting subsequent ones of the audio segments from the plurality of audio program channels as they are being received in the received broadcast stream that correspond to the filter data.

31. A method of generating a playlist from one or more received broadcast streams comprising:
   receiving at least one broadcast stream comprising a plurality of multiplexed audio program channels, each of the audio program channels comprising audio segments for reception by all receivers configured to receive the at least one broadcast stream;
   receiving at least one user input indicating at least one of approval and disapproval of an audio segment that is currently being played back from among the audio segments in the received broadcast stream;
   generating filter data using the at least one user input and data corresponding to the audio segment that prompted that at least one user input;
   extracting selected ones of the audio segments from the audio program channels as they are being received in the received broadcast stream based on the filter data;
   generating a playlist by multiplexing and storing the extracted audio segments; and
   automatically playing back the audio segments in the playlist in a full mode if the number of stored audio segments is less than a defined threshold, and
   automatically playing back the audio segments in the playlist in a preview mode by playing back truncated versions of the audio segments, if the number of stored audio segments equals or is greater than a defined threshold.

32. The method of claim 31, wherein if an audio segment is played back in a truncated version, further comprising providing a user with a control input to select and playback a full length version of the audio segment.

33. The method of claim 32, further comprising providing an audible alert a defined number of seconds prior to the end of the truncated audio segment to remind a user to select full length playback.

34. The method of claim 31, wherein the length of the truncated segments is a function of the number of unplayed stored audio segments.

* * * * *